(12) United States Patent
Pullega et al.

(10) Patent No.: US 11,441,037 B2
(45) Date of Patent: Sep. 13, 2022

(54) PROCESS FOR PREPARING A SURFACE TREATED FILLER MATERIAL PRODUCT WITH MONO-SUBSTITUTED SUCCINIC ANHYDRIDE(S) AND A MIXTURE OF ALIPHATIC LINEAR OR BRANCHED CARBOXYLIC ACIDS COMPRISING STEARIC ACID

(71) Applicant: OMYA INTERNATIONAL AG, Oftringen (CH)

(72) Inventors: Francesco Pullega, Bologna (IT); Pierre Blanchard, Reyrieux (FR); Tazio Fornera, Zofingen (CH); Matthias Welker, Hesingue (FR)

(73) Assignee: ONYA INTERNATIONAL AG, Oftringen (CH)

( * ) Notice: Subject to any disclaimer, the term of this patent is extended or adjusted under 35 U.S.C. 154(b) by 185 days.

(21) Appl. No.: 16/620,550

(22) PCT Filed: Jun. 12, 2018

(86) PCT No.: PCT/EP2018/065526
§ 371 (c)(1),
(2) Date: Dec. 9, 2019

(87) PCT Pub. No.: WO2018/229061
PCT Pub. Date: Dec. 20, 2018

(65) Prior Publication Data
US 2020/0157354 A1 May 21, 2020

Related U.S. Application Data

(60) Provisional application No. 62/522,759, filed on Jun. 21, 2017.

(30) Foreign Application Priority Data

Jun. 14, 2017 (EP) ..................................... 17176142

(51) Int. Cl.
C08K 3/26 (2006.01)
C09C 1/02 (2006.01)
C08K 9/04 (2006.01)

(52) U.S. Cl.
CPC ............... *C09C 1/021* (2013.01); *C08K 3/26* (2013.01); *C08K 9/04* (2013.01); *C01P 2004/61* (2013.01); *C01P 2004/62* (2013.01); *C01P 2006/12* (2013.01); *C01P 2006/82* (2013.01); *C08K 2003/265* (2013.01); *C08K 2201/005* (2013.01); *C08K 2201/006* (2013.01)

(58) Field of Classification Search
CPC ...... C08K 3/26; C08K 9/04; C08K 2003/265; C08K 2201/005; C08K 2201/006; C08K 9/00; C09C 1/021; C01P 2004/61; C01P 2004/62; C01P 2006/12; C01P 2006/82

USPC ......................................................... 523/210
See application file for complete search history.

(56) References Cited

U.S. PATENT DOCUMENTS

| | | | |
|---|---|---|---|
| 4,407,986 A | 10/1983 | Nomura et al. | |
| 4,520,073 A | 5/1985 | Randolph et al. | |
| 9,783,682 B2* | 10/2017 | Rentsch | C08K 9/08 |
| 10,287,407 B2* | 5/2019 | Brunner | C08J 5/18 |
| 10,941,279 B2* | 3/2021 | Brunner | C08K 3/26 |
| 11,098,191 B2* | 8/2021 | Blanchard | C08L 101/16 |
| 2002/0102404 A1 | 8/2002 | Nakai et al. | |
| 2017/0204536 A1* | 7/2017 | Brunner | D01D 5/0885 |
| 2018/0201790 A1 | 7/2018 | Rentsch et al. | |

FOREIGN PATENT DOCUMENTS

| | | |
|---|---|---|
| EP | 0325114 A2 | 7/1989 |
| EP | 0998522 A1 | 5/2000 |
| EP | 1980588 A1 | 10/2008 |

(Continued)

OTHER PUBLICATIONS

International Search Report from PCT/EP2018/065526 dated Jul. 4, 2018, 4 pages.
Written Opinion from PCT/EP2018/065526 dated Jul. 4, 2018, 7 pages.
EP Patent No. 0325114 A2 (Jul. 26, 1989)—English-language abstract from Espacenet, 2 pages.
JP Patent Appl. No. S54162746 A (Dec. 24, 1979)—English-language abstract from Espacenet, 1 page.

(Continued)

*Primary Examiner* — Hannah J Pak
(74) *Attorney, Agent, or Firm* — ALGM LLP; Harry J. Guttman

(57) ABSTRACT

The present invention relates to a process for preparing a surface treated filler material product with mono-substituted succinic anhydride(s) and a mixture of aliphatic linear or branched carboxylic acids comprising stearic acid, a surface treated filler material product, a polymer composition, a fiber and/or filament and/or film and/or thread and/or sheet and/or pipe and/or profile and/or mold and/or, injection molds and/or blow mold comprising the surface treated filler material product and/or the polymer composition, an article comprising the surface treated filler material product and/or the polymer composition and/or the fiber and/or filament and/or film and/or thread and/or sheet and/or pipe and/or profile and/or mold and/or injection mold and/or blow mold as well as the use of at least one mono-substituted succinic anhydride and/or salty reaction product(s) thereof in combination with a mixture of aliphatic linear or branched carboxylic acids comprising stearic acid and/or salty reaction product(s) thereof, for improving the flowability of a surface treated filler material product and for improving the dispersion of the calcium carbonate in the polymer matrix of a polymer composition.

23 Claims, 2 Drawing Sheets

(56) References Cited

FOREIGN PATENT DOCUMENTS

| | | |
|---|---|---|
| EP | 2159258 A1 | 3/2010 |
| EP | 2910609 A1 | 8/2015 |
| EP | 2952543 A1 | 12/2015 |
| EP | 2975078 A1 | 1/2016 |
| EP | 3018174 A1 | 5/2016 |
| GB | 2336366 A | 10/1999 |
| JP | S54162746 A | 12/1979 |
| WO | 1992/002587 A1 | 2/1992 |
| WO | 1999/061521 A1 | 12/1999 |
| WO | 2000/020336 A1 | 4/2000 |
| WO | 2001/032787 A1 | 5/2001 |
| WO | 2003/082966 A1 | 10/2003 |
| WO | 2008/077156 A2 | 6/2008 |
| WO | 2014/060286 A1 | 4/2014 |
| WO | 2015124500 A1 | 8/2015 |
| WO | 2016/023937 A1 | 2/2016 |
| WO | 2016151021 A1 | 9/2016 |

OTHER PUBLICATIONS

Dearmitt et al., Improved thermoplastic composites by optimised surface treatment of the mineral fillers, Institute for Surface Chemistry, Aug. 2000, 65 pages.

* cited by examiner

PROCESS FOR PREPARING A SURFACE TREATED FILLER MATERIAL PRODUCT WITH MONO-SUBSTITUTED SUCCINIC ANHYDRIDE(S) AND A MIXTURE OF ALIPHATIC LINEAR OR BRANCHED CARBOXYLIC ACIDS COMPRISING STEARIC ACID

The present invention relates to a process for preparing a surface treated filler material product with mono-substituted succinic anhydride(s) and a mixture of aliphatic linear or branched carboxylic acids comprising stearic acid, a surface treated filler material product, a polymer composition, a fiber and/or filament and/or film and/or thread and/or sheet and/or pipe and/or profile and/or mold and/or, injection mold and/or blow mold comprising the surface treated filler material product and/or the polymer composition, an article comprising the surface treated filler material product and/or the polymer composition and/or the fiber and/or filament and/or film and/or thread and/or sheet and/or pipe and/or profile and/or mold and/or injection mold and/or blow mold as well as the use of at least one mono-substituted succinic anhydride and/or salty reaction product(s) thereof in combination with a mixture of aliphatic linear or branched carboxylic acids comprising stearic acid and/or salty reaction product(s) thereof, for improving the flowability of a surface treated filler material product and for improving the dispersion of the calcium carbonate in the polymer matrix of a polymer composition.

In practice, filler materials and especially calcium carbonate-containing filler materials are often used as particulate fillers in thermoplastic polymer products, like fibers, filaments, films and/or threads, usually made of polyethylene (PE), polypropylene (PP), polyurethane (PU), polyvinylchloride (PVC), polyester (PES) and/or polyamide (PA). However, additives are introduced to provide the filler material with a coating and to improve the dispersion of said mineral filler material in the polymer matrix of polymer compositions as well as possibly to improve the processability of this polymer composition and/or properties of the final application products such as fibers, filaments, films, threads, sheets, pipes, profiles, molds, injection molds, blow molds. An elimination of such additives would unacceptably reduce the resulting fiber, filament, film, thread, sheets, pipes, profiles, molds, injection molds, blow molds quality. Furthermore, it is desired to provide a filler material with a high flowability in order to ensure a high productivity when manufacturing the final treated mineral filler material product and further processing said product into final application products.

In the art, several attempts have been made to improve the applicability of mineral filler materials and especially calcium carbonate-containing mineral filler materials, e.g. by treating such mineral filler materials with surface treatment agents. For instance, WO 00/20336 relates to an ultrafine natural calcium carbonate, which may optionally be treated with one or several fatty acids or one or several salts or mixtures thereof, and which is used as a rheology regulator for polymer compositions.

Likewise, U.S. Pat. No. 4,407,986 relates to a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

EP 0 998 522 relates to surface treated calcium carbonate filler for breathable films using fatty acids of at least 10 carbon atoms wherein the filler before and after the treatment process has to be mostly free of moisture in the range of below 0.1 wt.-%.

DeArmitt et al., Improved thermoplastic composites by optimised surface treatment of the mineral fillers, Institute for Surface Chemistry, August 2000, describes a wet treatment process in which a batch suspension comprising a mineral filler material is contacted with a dispersant at room temperature for one hour. However, such wet treatment process has the disadvantage that the wetting of a dry product for treatment and the subsequent drying is energy- and cost-consuming.

In EP 0 325 114, relating to non-sagging underseal compositions for motor vehicles based on polyvinyl chloride which has improved rheological and adhesion properties, Example 7 discloses a mixture of an ammonium salt of 12-hydroxystearic acid in combination with a fatty acid (in a weight ratio of 1:1) used to treat a mineral filler.

WO 03/082966 relates to a cross-linkable and/or cross-linked nanofiller composition which, in optional embodiments, may additionally include fillers that may or may not be coated with stearic acid, stearate, silane, siloxane and/or titanate. Such nanofiller compositions are used to increase barrier properties, strength and heat distortion temperatures, making them useful in medical, automotive, electrical, construction and food application.

US 2002/0102404 describes dispersible calcium carbonate particles coated on their surface with a combination of saturated and unsaturated aliphatic carboxylic acids and salts thereof along with an organic compound such as a phthalic ester, which are used in adhesive compositions to improve viscosity stability and adhesion properties. Moreover, US 2002/0102404 requires the implementation of a mixture of saturated and unsaturated aliphatic carboxylic acids/salts. The presence of unsaturated aliphatic carboxylic acids/salts increases the risk of unwanted in situ side reactions with the double bond during processing of any unsaturated aliphatic carboxylic acid/salt-comprising material. Additionally, the presence of unsaturated aliphatic carboxylic acids/salts may result in discoloration of, or unwanted odour development, and notably rancid odours, in the material in which they are implemented.

Claim 11 of WO 92/02587 indicates that a saponified sodium salt solution of at least one high molecular weight unsaturated fatty acid or combination of at least one high molecular weight unsaturated fatty acid and at least one high molecular weight unsaturated fatty acid, may be added to a pre-heated slurry of precipitated calcium carbonate, to ultimately produce a desired level of fatty acid coating on the calcium carbonate before proceeding with further process steps.

The abstract of JP54162746 discloses a composition comprising given relative amounts of rigid vinyl chloride resin, fatty acid treated-colloidal calcium carbonate, and barium stearate used in order to improve the heat stability of the vinyl chloride composition.

U.S. Pat. No. 4,520,073 describes mineral filler materials with improved hydrophobic coatings prepared by pressure coating of porous minerals using steam as a carrier for the coating material. Said coating material may be selected, among other options, from long chain aliphatic fatty acids and their salts.

WO 01/32787 describes a particulate alkaline earth metal carbonate material product which has on its particles a coating of hydrophobic material comprising a composition formed of (a) a first component which comprises the reaction product of the alkaline earth metal carbonate and at least one given aliphatic carboxylic acid and (b) a second component having a carbonate release temperature substantially higher than the first component comprises a compound of formula $CH_3(CH_2)_mCOOR$.

WO 2008/077156 A2 relates to spunlaid fibers comprising at least one polymeric resin and at least one filler having an average particle size of less than or equal to about 5 microns and/or having a top cut of less than about 15 microns, wherein the at least one filler is present in an amount of less than about 40% by weight, relative to the total weight of the spunlaid fibers. The coating of the filler is described as being at least one organic material chosen from fatty acids and salts and esters thereof, e.g. stearic acid, stearate, ammonium stearate and calcium stearate.

GB 2 336 366 A relates to filled thermoplastic compositions, and, in particular, filled low density polyethylene compositions which are to be formed into products or articles by the process of extrusion. It is further described that the hydrophobising agent is preferably an organic carboxylic acid or partially or fully neutralised salt thereof which has at least one saturated or unsaturated hydrocarbon chain having from 8 to 28 carbon atoms, if the particulate mineral filler has a neutral to alkaline surface reaction, for example calcium carbonate.

EP2159258A1 relates to a treated mineral filler product comprising: a) at least one mineral filler; b) a treatment layer located on the surface of said mineral filler(s), said treatment layer comprising: at least one saturated C8 to C24 aliphatic carboxylic acid; and at least one di and/or trivalent cation salt of one or more saturated C8 to C24 aliphatic carboxylic acid; characterised in that: the weight ratio of all of said aliphatic carboxylic acid salt(s):all of said aliphatic carboxylic acid(s) is from 51:49 to 75:25; and said treatment layer is present in an amount of at least 2.5 mg/m² of said mineral filler.

EP1980588A1 relates to a process for the preparation of a treated mineral filler product comprises the following steps: (a) treating at least one dry mineral filler with at least one Group II or Group III salt of a C8 to C24 aliphatic monocarboxylic acid to produce an intermediate mineral filler product; followed by (b) treating the intermediate mineral filler product of step (a) with at least one C8 to C24 aliphatic monocarboxylic acid to produce a treated mineral filler product.

One surface treatment agent currently of choice and of particular relevance is a mono-substituted succinic anhydride or a mixture of mono-substituted succinic anhydrides.

For example, WO 2014/060286 A1 refers to a process for preparing a surface treated filler material product with succinic anhydride(s), the process comprising at least the steps of:
a) providing at least one calcium carbonate-containing filler material having
   i) a weight median particle size $d_{50}$ value in the range from 0.1 μm to 7 μm,
   ii) a top cut ($d_{98}$) of ≤15 μm,
   iii) a specific surface area (BET) of from 0.5 to 150 m²/g as measured by the BET nitrogen method, and
   iv) a residual total moisture content of from 0.01 wt.-% to 1 wt.-%, based on the total dry weight of the at least one calcium carbonate-containing filler material,
b) providing at least one mono-substituted succinic anhydride and optionally at least one mono-substituted succinic acid in an amount of from 0.1 to 3 wt.-%, based on the total dry weight of the at least one calcium carbonate-containing filler material of step a),
c) contacting the surface of the at least one calcium carbonate-containing filler material of step a) under mixing, in one or more steps, with the at least one mono-substituted succinic anhydride and the optional at least one mono-substituted succinic acid of step b) such that a treatment layer comprising the at least one mono-substituted succinic anhydride and the optional at least one mono-substituted succinic acid and/or salty reaction product(s) thereof is formed on the surface of said at least one calcium carbonate-containing filler material of step a),
wherein the temperature before and/or during contacting step c) is adjusted such that the temperature is at least 2° C. above the melting point of the at least one mono-substituted succinic anhydride and the optional at least one mono-substituted succinic acid.

WO 2016/023937 A1 refers to a process for producing a breathable film comprising the steps of: a) providing a composition comprising at least one thermoplastic polymer and a surface-treated filler material product, and b) forming a film from the composition of step a), and c) stretching the film obtained in step b) into at least one direction, wherein the surface-treated filler material product comprises A) at least one ground calcium carbonate-comprising filler material having
   a weight median particle size $d_{50}$ in the range from 0.1 μm to 7 μm, —a top cut particle size of <15 μm,
   a specific surface area (BET) from 0.5 to 150 m²/g, as measured using nitrogen and the BET method according to ISO 9277, and
   a residual total moisture content of <1 wt.-, based on the total dry weight of the at least one ground calcium carbonate-comprising filler material, and
B) a treatment layer on the surface of the at least one wet ground calcium carbonate-comprising filler material comprising at least one mono-substituted succinic anhydride and/or at least one mono-substituted succinic acid and/or salty reaction product(s) thereof,
wherein the surface-treated filler material product comprises the treatment layer in an amount of from 0.1 to 3 wt.-%, based on the total dry weight of the at least one ground calcium carbonate-comprising filler material.

However, there is still a need for providing processes for preparing surface treated filler material products comprising mono-substituted succinic anhydride(s) which allow for preparing surface treated calcium carbonate-containing mineral filler materials for improving its flowability and further to improve its dispersion in the polymer matrix of a polymer composition, especially compared to a product which has been surface-treated with mono-substituted succinic anhydride(s) only. Furthermore, it is desired to maintain or to improve the mechanical properties of final application products such as a fiber and/or filament and/or film and/or thread and/or sheet and/or pipe and/or profile and/or mold and/or injection mold and/or blow mold comprising such surface treated filler material products.

Accordingly, it is an objective of the present invention to provide a process for preparing a surface treated filler material product which comprises mono-substituted succinic anhydride(s). Furthermore, it is desirable to provide a process for preparing a surface treated filler material product having improved flowability, especially compared to a product being surface treated with mono-substituted succinic anhydride(s). A further objective is to provide a process for preparing a surface treated filler material product having an improved dispersion in the polymer matrix of a polymer composition, especially compared to a product being surface treated with mono-substituted succinic anhydride(s). Further objectives can be gathered from the following description of the invention.

The foregoing and other objectives are solved by the subject-matter as defined herein in claim 1.

Advantageous embodiments of the inventive a process for preparing a surface treated filler material product are defined in the corresponding sub-claims.

According to one aspect of the present application a process for preparing a surface treated filler material product with mono-substituted succinic anhydride(s) and a mixture of aliphatic linear or branched carboxylic acids comprising stearic acid, the process comprising at least the steps of:
  a) providing at least one calcium carbonate-containing filler material,
  b) providing at least one mono-substituted succinic anhydride,
  c) providing a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24,
  d) contacting the surface of the at least one calcium carbonate-containing filler material of step a), under mixing, in one or more steps, in any order, with the at least one mono-substituted succinic anhydride of step b) and the mixture of aliphatic linear or branched carboxylic acids of step c) such that a treatment layer comprising the at least one mono-substituted succinic anhydride and/or salty reaction product(s) thereof and the mixture of aliphatic linear or branched carboxylic acids and/or salty reaction product(s) thereof is formed on the surface of said at least one calcium carbonate-containing filler material of step a), wherein the temperature before and/or during contacting step d) is adjusted such that the at least one mono-substituted succinic anhydride and the mixture of aliphatic linear or branched carboxylic acids is in a molten or liquid state.

The inventors surprisingly found out that the foregoing process for preparing a surface treated filler material product results, in comparison to a product being surface treated with mono-substituted succinic anhydride(s) only, in a surface treated filler material product having improved flowability and in an improved dispersion of the surface treated filler material product in the polymer matrix of a polymer composition. As a result, the process thus also imparts improved mechanical properties to a fiber and/or filament and/or film and/or thread and/or sheet and/or pipe and/or profile and/or mold and/or injection mold and/or blow mold and the corresponding articles comprising said surface treated filler material product. More precisely, the inventors found out that the surface characteristics of a surface treated filler material product being obtained by said process can be improved by the addition of defined mono-substituted succinic anhydride(s) in combination with a mixture of aliphatic linear or branched carboxylic acids comprising stearic acid.

It should be understood that for the purposes of the present invention, the following terms have the following meanings:

For the purpose of the present invention, the term "filler material" in the meaning of the present invention refers to substances of mineral origin added to materials such as paper, plastics, rubber, paints and adhesives, etc. to lower the consumption of more expensive materials such as binders, or to enhance technical properties of the products. The person skilled in the art very well knows the typical filler materials used in the respective fields. Furthermore, the term "calcium carbonate-containing filler material" refers to a material that comprises at least 80 wt.-% calcium carbonate, based on the total dry weight of the calcium carbonate-containing filler material.

The term "surface treated filler material product" in the meaning of the present invention refers to a calcium carbonate-containing filler material which has been contacted with a surface treatment agent such as to obtain a coating layer on at least a part of the surface of the calcium carbonate-containing filler material.

The term "succinic anhydride", also called dihydro-2,5-furandione, succinic acid anhydride or succinyl oxide, has the molecular formula $C_4H_4O_3$ and is the acid anhydride of succinic acid.

The term "mono-substituted" succinic anhydride in the meaning of the present invention refers to a succinic anhydride substituted with one substituent.

The term "mono-substituted" succinic acid in the meaning of the present invention refers to a succinic acid substituted with one substituent.

The term "dry" calcium carbonate-containing filler material is understood to be a filler material having less than 0.3% by weight of water relative to the filler material weight. The % water (equal to residual total moisture content) is determined according to the Coulometric Karl Fischer measurement method, wherein the filler material is heated to 220° C., and the water content released as vapour and isolated using a stream of nitrogen gas (at 100 ml/min) is determined in a Coulometric Karl Fischer unit.

The term "salty reaction products" of mono-substituted succinic anhydride(s) in the meaning of the present invention refers to products obtained by contacting a calcium carbonate-containing filler material with one or more mono-substituted succinic anhydride(s). Said salty reaction products are formed between the mono-substituted succinic acid which is formed from the applied mono-substituted succinic anhydride and reactive molecules located at the surface of the calcium carbonate-containing filler material.

The term "salty reaction products" of a mixture of aliphatic linear or branched carboxylic acids comprising stearic acid in the meaning of the present invention refers to products obtained by contacting a calcium carbonate-containing filler material with a mixture of aliphatic linear or branched carboxylic acids comprising stearic acid. Said salty reaction products are formed between the mixture of aliphatic linear or branched carboxylic acids comprising stearic acid and reactive molecules located at the surface of the calcium carbonate-containing filler material.

A "treatment layer" in the gist of the present invention refers to a layer, preferably a monolayer of a treatment agent on the surface of the surface treated filler material product. The "treatment layer" essentially consists of at least one mono-substituted succinic anhydride and/or salty reaction product(s) thereof and a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof.

The term "essentially" in the meaning of the present invention refers to a treatment layer that contains compounds differing from the at least one mono-substituted succinic anhydride and/or salty reaction product(s) thereof and the mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof, in an amount of <5 wt.-%, preferably <2 wt.-% and most preferably <1 wt.-%, based on the total weight of the treatment layer.

A "specific surface area (SSA)" of a calcium carbonate-containing filler material in the meaning of the present invention is defined as the surface area of the calcium carbonate-containing filler material divided by its mass. As used herein, the specific surface area is measured by nitrogen gas adsorption using the BET isotherm (ISO 9277:2010) and is specified in $m^2/g$.

The "particle size" of particulate materials, for example the calcium carbonate-containing filler material herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. The $d_{98}$ value is the particle size at which 98 wt.-% of all particles are smaller than that particle size. The $d_{98}$ value is also designated as "top cut". Particle sizes were determined by using a Sedigraph™5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

The term "molten" state in the meaning of the present invention is defined as the state in which a material is entirely liquid, in other words is entirely melted. Whereas the phenomenon of melting occurs at constant temperature on application of energy, a substance is qualified as being molten as of the moment following melting when the temperature begins to rise, as observed on a curve plotting temperature versus energy input obtained by Dynamic Scanning calorimetry, DSC, (DIN 51005: 1983-11).

The term "liquid" state according to the present invention refers to a material that is liquid under standard ambient temperature and pressure (SATP) which refers to a temperature of 298.15 K (25° C.) and an absolute pressure of exactly 100 000 Pa (1 bar, 14.5 psi, 0.98692 atm).

Where the term "comprising" is used in the present description and claims, it does not exclude other non-specified elements of major or minor functional importance.

For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to another aspect of the present invention, a surface treated filler material product is provided, comprising
 a) at least one calcium carbonate-containing filler material,
 b) a treatment layer on the surface of the at least one calcium carbonate-containing filler material comprising at least one mono-substituted succinic anhydride and/or salty reaction product(s) thereof and a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof,
 wherein the surface treated filler material product comprises the treatment layer in an amount of from 0.2 to 6 wt.-%, based on the total dry weight of the at least one calcium carbonate-containing filler material.

It is preferred that the surface treated filler material product is in form of a powder. It is also preferred that the surface treated filler material product is obtainable by a process as defined herein.

According to a further aspect of the present invention, a polymer composition is provided, comprising at least one polymeric resin and from 1 to 95 wt.-%, based on the total weight of the polymer composition, of the surface treated filler material product. It is preferred that the at least one polymeric resin is at least one thermoplastic polymer, preferably a thermoplastic polymer selected from the group comprising homopolymers and/or copolymers of polyolefins, polyamides, halogen-containing polymers and/or polyesters. It is also preferred that the polymer composition is a masterbatch, preferably the masterbatch comprises the surface treated filler material product in an amount of from 50 to 95 wt.-%, preferably from 60 to 85 wt.-% and more preferably from 70 to 80 wt.-%, based on the total weight of the masterbatch.

According to a still further aspect of the present invention, a fiber and/or filament and/or film and/or thread and/or sheet and/or pipe and/or profile and/or mold and/or, injection mold and/or blow mold is provided, comprising the surface treated filler material product and/or the polymer composition. According to another aspect of the present invention, an article comprising the surface treated filler material product and/or a polymer composition and/or a fiber and/or filament and/or film and/or thread and/or sheet and/or pipe and/or profile and/or mold and/or, injection mold and/or blow mold is provided, wherein the article is selected from the group comprising hygiene products, medical and healthcare products, filter products, geotextile products, agriculture and horticulture products, clothing, footwear and baggage products, household and industrial products, packaging products, construction products and the like. It is preferred that the article is a packaging product selected from the group comprising carrier bags, waste bags, transparent foils, hygiene films, agriculture foils, paper like foils, bottles, (thermoform) foils, extrusion coated papers and boards, boxboards, paperboard cartons, paper bags, sacks, corrugated boxes, flexible tubes, such as for cremes, e.g. dermal cremes, and cosmetics, bags, such as for household waste and crates, oriented and bi-oriented films, trays and the like.

According to another aspect of the present invention, the use of at least one mono-substituted succinic anhydride and/or salty reaction product(s) thereof in combination with a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof, for improving the flowability of a surface treated filler material product is provided. According to a further aspect of the present invention, the use of at least one mono-substituted succinic anhydride and/or salty reaction product(s) thereof in combination with a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof, for improving the dispersion of the calcium carbonate in the polymer matrix of a polymer composition is provided. It is preferred that the improvement is achieved if, when measuring powder flowability with the shear cell method on a FT4 powder Rheometer using the stability and variable flow rate method (ASTM D7891-15) with a pre-shear normal stress of 15 kPa, the unconfined yield strength (UYS) is decreased by at least 7%, or the flow factor (FF) is increased by at least 7%, and/or, when measuring powder flowability via the stability and variable flow rate method on a FT4 powder Rheometer, the basic flowability energy (BFE) is decreased by at least 7% in comparison to the same surface treated filler material product treated with the at least one mono-substituted succinic anhydride only. It is appreciated that the FT4 powder Rheometer (of Freeman Technology, UK) is equipped with the Powder Rheometer software (v 5.000.00012) and Freeman Technology Data Analysis Software version 4.0.17.

According to one embodiment of the present invention, the calcium carbonate-containing filler material of step a) is selected from the group consisting of ground calcium carbonate, preferably marble, limestone, dolomite and/or chalk, precipitated calcium carbonate (PCC), preferably vaterite, calcite and/or aragonite, surface-reacted calcium carbonate (MCC) and mixtures thereof, more preferably the calcium carbonate-containing filler material is ground calcium carbonate.

According to another embodiment of the present invention, the at least one calcium carbonate-containing filler material of step a) has a) a weight median particle size $d_{50}$ value in the range from 0.1 µm to 7 µm, preferably from 0.25 µm to 5 µm and most preferably from 0.5 µm to 4 µm, and/or b) a top cut ($d_{98}$) of ≤50 µm, preferably ≤40 µm, more preferably ≤25 µm and most preferably ≤15 µm, and/or c) a specific surface area (BET) of from 0.5 to 150 m²/g, preferably from 0.5 to 50 m²/g, more preferably from 0.5 to 35 m²/g and most preferably from 0.5 to 10 m²/g as measured by the BET nitrogen method, and/or d) a residual total moisture content of from 0.01 wt.-% to 1 wt.-%, preferably from 0.01 to 0.2 wt.-%, more preferably from 0.02 to 0.2 wt.-% and most preferably from 0.04 to 0.2 wt.-%, based on the total dry weight of the at least one calcium carbonate-containing filler material.

According to yet another embodiment of the present invention, the at least one calcium carbonate-containing filler material of step a) is preheated before contacting step d) is carried out, preferably the at least one calcium carbonate-containing filler material of step a) is preheated at a temperature of from 20 to 200° C., more preferably of from 40 to 200° C., even more preferably of from 50 to 150° C. and most preferably of from 60 to 130° C.

According to one embodiment of the present invention, the at least one mono-substituted succinic anhydride of step b) consists of succinic anhydride mono-substituted with a group selected from a linear, branched, aliphatic and cyclic group having a total amount of carbon atoms from C2 to C30, preferably from C3 to C25 and most preferably from C4 to C20 in the substituent.

According to another embodiment of the present invention, the at least one mono-substituted succinic anhydride of step b) is a) at least one alkyl mono-substituted succinic anhydride, preferably at least one alkyl mono-substituted succinic anhydride selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof, and/or b) at least one alkenyl mono-substituted succinic anhydride, preferably at least one alkenyl mono-substituted succinic anhydride selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

According to yet another embodiment of the present invention, the mixture of saturated aliphatic linear or branched carboxylic acids of step c) comprises stearic acid and one or more further saturated aliphatic linear or branched carboxylic acid(s) having a total amount of carbon atoms from C8 to C22, preferably from C10 to C22, more preferably from C12 to C20 and most preferably from C14 to C20.

According to one embodiment of the present invention, contacting step d) is carried out in that the at least one mono-substituted succinic anhydride of step b) and the mixture of saturated aliphatic linear or branched carboxylic acids of step c) are added in a weight ratio [succinic anhydride/mixture of carboxylic acids] of from 10:1 to 1:10, preferably from 5:1 to 1:5 and most preferably from 4:1 to 1:4, such as from 4:1 to 1:1.

According to another embodiment of the present invention, the at least one mono-substituted succinic anhydride of step b) is added in contacting step d) in a total amount of from 0.1 to 3 wt.-%, preferably of from 0.2 to 2 wt.-% and most preferably of from 0.3 to 1.5 wt.-%, based on the total dry weight of the at least one calcium carbonate-containing filler material of step a); and the mixture of saturated aliphatic linear or branched carboxylic acids of step c) is added in contacting step d) in a total amount of from 0.1 to 3 wt.-%, preferably of from 0.2 to 2 wt.-% and most preferably of from 0.3 to 1.5 wt.-%, based on the total dry weight of the at least one calcium carbonate-containing filler material of step a).

According to yet another embodiment of the present invention, contacting step d) is carried out at a temperature of from 20 to 200° C., preferably of from 40 to 150° C. and most preferably of from 60 to 130° C.

According to one embodiment of the present invention, contacting step d) is carried out in that the at least one mono-substituted succinic anhydride of step b) and the mixture of saturated aliphatic linear or branched carboxylic acids of step c) are added simultaneously or in that the mixture of saturated aliphatic linear or branched carboxylic acids of step c) is added after the at least one mono-substituted succinic anhydride of step b), preferably in that the mixture of saturated aliphatic linear or branched carboxylic acids of step c) is added after the at least one mono-substituted succinic anhydride of step b).

According to another embodiment of the present invention, the at least one mono-substituted succinic anhydride is provided in step b) in a quantity such that the total weight of said at least one mono-substituted succinic anhydride and/or salty reaction product(s) thereof on the surface of the at least one calcium carbonate-containing filler material is less than 5 mg/m$^2$, such as from 0.1 to 5 mg/m$^2$, preferably less than 4.5 mg/m$^2$, more preferably less than 4.0 mg/m$^2$, such as from 0.2 to 4 mg/m$^2$ or from 1 to 4 mg/m$^2$, of the at least one calcium carbonate-containing filler material provided in step a) and/or the mixture of saturated aliphatic linear or branched carboxylic acids of step c) is provided in step c) in a quantity such that the total weight of the mixture of saturated aliphatic linear or branched carboxylic acids and/or salty reaction product(s) thereof on the surface of the surface treated filler material product is less than 5 mg/m$^2$, such as from 0.1 to 5 mg/m$^2$, preferably less than 4.5 mg/m$^2$, more preferably less than 4.0 mg/m$^2$, such as from 0.2 to 4 mg/m$^2$ or from 1 to 4 mg/m$^2$, of the at least one calcium carbonate-containing filler material provided in step a).

As set out above, the inventive process for preparing a surface treated filler material product with mono-substituted succinic anhydride(s) and a mixture of aliphatic linear or branched carboxylic acids comprising stearic acid comprises at least the process steps of a), b), c) and d). In the following, it is referred to further details of the present invention and especially the foregoing steps of the inventive process for preparing a surface treated filler material product.

Characterization of Step a): Provision of at Least One Calcium Carbonate-Containing Filler Material According to step a) of the process of the present invention, at least one calcium carbonate-containing filler material is provided.

The expression "at least one" calcium carbonate-containing filler material means that one or more, for example, two or three calcium carbonate-containing filler material may be provided. According to a preferred embodiment, only one calcium carbonate-containing filler material is provided in step a).

According to a preferred embodiment of the present invention the calcium carbonate-comprising material is selected from the group consisting of ground calcium carbonate (GCC), preferably marble, limestone, dolomite and/or chalk, precipitated calcium carbonate (PCC), preferably vaterite, calcite and/or aragonite, surface-reacted calcium carbonate (MCC) and mixtures thereof, more preferably the at least one calcium carbonate-comprising material is ground calcium carbonate.

GCC is understood to be a naturally occurring form of calcium carbonate, mined from sedimentary rocks such as limestone or chalk, or from metamorphic marble rocks and processed through a treatment such as grinding, screening and/or fractionizing in wet and/or dry form, for example by a cyclone or classifier. In one embodiment of the present invention, the GCC is selected from the group comprising marble, chalk, dolomite, limestone and mixtures thereof.

By contrast, calcium carbonate of the PCC type include synthetic calcium carbonate products obtained by carbonation of a slurry of calcium hydroxide, commonly referred to in the art as a slurry of lime or milk of lime when derived from finely divided calcium oxide particles in water or by precipitation out of an ionic salt solution. PCC may be rhombohedral and/or scalenohedral and/or aragonitic; preferred synthetic calcium carbonate or precipitated calcium carbonate comprising aragonitic, vateritic or calcitic mineralogical crystal forms or mixtures thereof.

"Surface-reacted calcium carbonate" in the meaning of the present invention may feature a natural ground or precipitated calcium carbonate with an internal structure modification or a surface-reaction product.

In one preferred embodiment, the at least one calcium carbonate-containing filler material is marble.

It is appreciated that the amount of calcium carbonate in the at least one calcium carbonate-containing filler material is at least 80 wt.-%, e.g. at least 95 wt.-%, preferably between 97 and 100 wt.-%, more preferably between 98.5 and 99.95 wt.-%, based on the total dry weight of the at least one calcium carbonate-containing filler material.

The at least one calcium carbonate-containing filler material is preferably in the form of a particulate material, and may have a particle size distribution as conventionally employed for the material(s) involved in the type of product to be produced. In general, it is preferred that the at least one calcium carbonate-containing filler material has a weight median particle size $d_{50}$ value in the range from 0.1 to 7 μm. For example, the at least one calcium carbonate-containing filler material has a weight median particle size $d_{50}$ from 0.25 μm to 5 μm and preferably from 0.5 μm to 4 μm.

Additionally or alternatively, the at least one calcium carbonate-containing filler material has a top cut ($d_{98}$) of ≤50 μm. For example, the at least one calcium carbonate-containing filler material has a top cut ($d_{98}$) of ≤40 μm, preferably of ≤25 μm and most preferably of ≤15 μm.

It is further preferred that the at least one calcium carbonate-containing filler material has a BET specific surface area of from 0.5 and 150 m$^2$/g as measured by the BET nitrogen method. For example, the at least one calcium carbonate-containing filler material has a specific surface area (BET) of from 0.5 to 50 m$^2$/g, more preferably of from 0.5 to 35 m$^2$/g and most preferably of from 0.5 to 10 m$^2$/g as measured by the BET nitrogen method.

Thus, it is preferred that the at least one calcium carbonate-containing filler material has
 a) a weight median particle size $d_{50}$ value in the range from 0.1 μm to 7 μm, preferably from 0.25 μm to 5 μm and most preferably from 0.5 μm to 4 μm, and/or
 b) a top cut ($d_{98}$) of ≤50 μm, preferably ≤40 μm, more preferably ≤25 μm and most preferably ≤15 μm, and/or
 c) a specific surface area (BET) of from 0.5 to 150 m$^2$/g, preferably from 0.5 to 50 m$^2$/g, more preferably from 0.5 to 35 m$^2$/g and most preferably from 0.5 to 10 m$^2$/g as measured by the BET nitrogen method.

For example, the at least one calcium carbonate-containing filler material has
 a) a weight median particle size $d_{50}$ value in the range from 0.1 μm to 7 μm, preferably from 0.25 μm to 5 μm and most preferably from 0.5 μm to 4 μm, or
 b) a top cut ($d_{98}$) of ≤50 μm, preferably ≤40 μm, more preferably ≤25 μm and most preferably ≤15 μm, or
 c) a specific surface area (BET) of from 0.5 to 150 m$^2$/g, preferably from 0.5 to 50 m$^2$/g, more preferably from 0.5 to 35 m$^2$/g and most preferably from 0.5 to 10 m$^2$/g as measured by the BET nitrogen method.

Preferably, the at least one calcium carbonate-containing filler material has a) a weight median particle size $d_{50}$ value in the range from 0.1 µm to 7 µm, preferably from 0.25 µm to 5 µm and most preferably from 0.5 µm to 4 µm, and b) a top cut ($d_{98}$) of ≤50 µm, preferably ≤40 µm, more preferably ≤25 µm and most preferably ≤15 µm, and c) a specific surface area (BET) of from 0.5 to 150 m²/g, preferably from 0.5 to 50 m²/g, more preferably from 0.5 to 35 m²/g and most preferably from 0.5 to 10 m²/g as measured by the BET nitrogen method.

In one embodiment of the present invention, the at least one calcium carbonate-containing filler material is preferably a marble having a median particle size diameter $d_{50}$ value from 0.1 µm to 7 µm, preferably from 0.25 µm to 5 µm and most preferably from 0.5 µm to 4 µm. In this case, the at least one calcium carbonate-containing filler material exhibits a BET specific surface area of from 0.5 to 150 m²/g, preferably of from 0.5 to 50 m²/g, more preferably of from 0.5 to 35 m²/g and most preferably of from 0.5 to 10 m²/g, measured by the BET nitrogen method.

It is preferred that the at least one calcium carbonate-containing filler material is a dry ground material, a material being wet ground and dried or a mixture of the foregoing materials. In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill an attrition mill, a pin mill, a hammer mill, a pulveriser, a shredder, a de-dumper, a knife cutter, or other such equipment known to the skilled man.

In case the at least one calcium carbonate-containing filler material is a wet ground calcium carbonate-containing filler material, the grinding step may be performed under conditions such that autogenous grinding takes place and/or by horizontal ball milling, and/or other such processes known to the skilled man. The wet processed ground calcium carbonate-containing filler material thus obtained may be washed and dewatered by well known processes, e.g. by flocculation, filtration or forced evaporation prior to drying. The subsequent step of drying may be carried out in a single step such as spray drying, or in at least two steps, e.g. by applying a first heating step to the calcium carbonate-containing filler material in order to reduce the associated moisture content to a level which is not greater than about 0.5 wt.-%, based on the total dry weight of the at least one calcium carbonate-containing filler material. The residual total moisture content of the filler can be measured by the Karl Fischer coulometric titration method, desorbing the moisture in an oven at 195° C. and passing it continuously into the KF coulometer (Mettler Toledo coulometric KF Titrator C30, combined with Mettler oven DO 0337) using dry $N_2$ at 100 ml/min for 10 min. The residual total moisture content can be determined with a calibration curve and also a blind of 10 min gas flow without a sample can be taken into account. The residual total moisture content may be further reduced by applying a second heating step to the at least one calcium carbonate-containing filler material. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the at least one calcium carbonate-containing filler material is subjected to a beneficiation step (such as a flotation, bleaching or magnetic separation step) to remove impurities.

In one embodiment of the present invention, the at least one calcium carbonate-containing filler material comprises a dry ground calcium carbonate-containing filler material. In another preferred embodiment, the at least one calcium carbonate-containing filler material is a material being wet ground in a horizontal ball mill, and subsequently dried by using the well known process of spray drying.

Depending on the at least one calcium carbonate-containing filler material, the at least one calcium carbonate-containing filler material preferably has a residual total moisture content of from 0.01 to 1 wt.-%, preferably from 0.01 to 0.2 wt.-%, more preferably from 0.02 to 0.2 wt.-% and most preferably from 0.04 to 0.2 wt.-%, based on the total dry weight of the at least one calcium carbonate-containing filler material.

For example, in case a wet ground and spray dried marble is used as the at least one calcium carbonate-containing filler material, the residual total moisture content of the at least one calcium carbonate-containing filler material is preferably of from 0.01 to 0.1 wt.-%, more preferably from 0.02 to 0.08 wt.-% and most preferably from 0.04 to 0.07 wt.-% based on the total dry weight of the at least one calcium carbonate-containing filler material. If a PCC is used as the at least one calcium carbonate-containing filler material, the residual total moisture content of the at least one calcium carbonate-containing filler material is preferably of from 0.01 to 0.2 wt.-%, more preferably from 0.05 to 0.17 wt.-% and most preferably from 0.05 to 0.15 wt.-%, based on the total dry weight of the at least one calcium carbonate-containing filler material.

Characterization of Step b): Provision of at Least One Mono-Substituted Succinic Anhydride According to step b) of the process of the present invention at least one mono-substituted succinic anhydride is provided.

It is appreciated that the expression "at least one" mono-substituted succinic anhydride means that one or more kinds of mono-substituted succinic anhydride may be provided in the process of the present invention.

Accordingly, it should be noted that the at least one mono-substituted succinic anhydride may be one kind of mono-substituted succinic anhydride(s). Alternatively, the at least one mono-substituted succinic anhydride may be a mixture of two or more kinds of mono-substituted succinic anhydrides. For example, the at least one mono-substituted succinic anhydride may be a mixture of two or three kinds of mono-substituted succinic anhydrides, like two kinds of mono-substituted succinic anhydrides.

In one embodiment of the present invention, the at least one mono-substituted succinic anhydride is one kind of mono-substituted succinic anhydride.

It is appreciated that the at least one mono-substituted succinic anhydride represents a surface treatment agent and consists of succinic anhydride mono-substituted with a group selected from any linear, branched, aliphatic and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic and cyclic group having a total amount of carbon atoms from C3 to C25 in the substituent. For example, the at least one mono-substituted succinic anhydride consists of succinic anhydride mono-substituted with a group selected from a linear, branched, aliphatic and cyclic group having a total amount of carbon atoms from C4 to C20 in the substituent.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C25 and most preferably from C4 to C20 in the substituent. Additionally or alternatively, the at least one mono-substituted succinic anhydride consists of succinic anhydride mono-substituted with one group being a branched and aliphatic group having a total amount of carbon atoms from C2 to C30, preferably from C3 to C25 and most preferably from C4 to C20 in the substituent.

Thus, it is preferred that the at least one mono-substituted succinic anhydride consists of succinic anhydride mono-substituted with one group being a linear or branched, alkyl group having a total amount of carbon atoms from C2 to C30, preferably from C3 to C25 and most preferably from C4 to C20 in the substituent.

For example, the at least one mono-substituted succinic anhydride consists of succinic anhydride mono-substituted with one group being a linear alkyl group having a total amount of carbon atoms from C2 to C30, preferably from C3 to C25 and most preferably from C4 to C20 in the substituent. Additionally or alternatively, the at least one mono-substituted succinic anhydride consists of succinic anhydride mono-substituted with one group being a branched alkyl group having a total amount of carbon atoms from C2 to C30, preferably from C3 to C25 and most preferably from C4 to C20 in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that e.g. the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear or branched alkenyl group having a total amount of carbon atoms from C2 to C30, preferably from C3 to C25 and most preferably from C4 to C20 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride.

Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5 wt.-%, based on the total weight of the at least one mono-substituted succinic anhydride provided in step b).

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

If the at least one mono-substituted succinic anhydride is a mixture of two or more kinds of alkenyl mono-substituted succinic anhydrides, one alkenyl mono-substituted succinic anhydride is linear or branched octadecenyl succinic anhydride, while each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. For example, the at least one mono-substituted succinic anhydride is a mixture of two or more kinds of alkenyl mono-substituted succinic anhydrides, wherein one alkenyl mono-substituted succinic anhydride is linear octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. Alternatively, the at least one mono-substituted succinic anhydride is a mixture of two or more kinds of alkenyl mono-substituted succinic anhydrides, wherein one alkenyl mono-substituted succinic anhydride is branched octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof.

For example, the at least one mono-substituted succinic anhydride is a mixture of two or more kinds of alkenyl mono-substituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the at least one mono-substituted succinic anhydride is a mixture of two or more kinds of alkenyl mono-substituted succinic anhydrides, it is appreciated that one alkenyl mono-substituted succinic anhydride is present in an amount of from 20 to 60 wt.-% and preferably of from 30 to 50 wt.-%, based on the total weight of the at least one mono-substituted succinic anhydride provided in step b).

For example, if the at least one mono-substituted succinic anhydride is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), it is preferred that the one or more octadecenyl succinic anhydride(s) is present in an amount of from 20 to 60 wt.-% and preferably of from 30 to 50 wt.-%, based on the total weight of the at least one mono-substituted succinic anhydride provided in step b).

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60.

Optionally, the at least one mono-substituted succinic anhydride is provided in combination with at least one mono-substituted succinic acid in step b) of the inventive process.

It is appreciated that the expression "at least one" mono-substituted succinic acid means that one or more kinds of mono-substituted succinic acid may be provided in step b) of the process of the present invention.

Accordingly, it should be noted that the at least one mono-substituted succinic acid may be one kind of mono-substituted succinic acid. Alternatively, the at least one mono-substituted succinic acid may be a mixture of two or more kinds of mono-substituted succinic acid. For example, the at least one mono-substituted succinic acid may be a mixture of two or three kinds of mono-substituted succinic acid, like two kinds of mono-substituted succinic acid.

In one embodiment of the present invention, the at least one mono-substituted succinic acid is one kind of mono-substituted succinic acid.

It is appreciated that the at least one mono-substituted succinic acid represents a surface treatment agent and consists of succinic acid mono-substituted with a group selected from any linear, branched, aliphatic and cyclic group having a total amount of carbon atoms from C2 to C30 in the substituent.

In one embodiment of the present invention, the at least one mono-substituted succinic acid consists of succinic acid mono-substituted with a group selected from a linear, branched, aliphatic and cyclic group having a total amount of carbon atoms from C3 to C25 in the substituent. For example, the at least one mono-substituted succinic acid consists of succinic acid mono-substituted with a group selected from a linear, branched, aliphatic and cyclic group having a total amount of carbon atoms from C4 to C20 in the substituent.

If the at least one mono-substituted succinic anhydride is provided with at least one mono-substituted succinic acid in process step b), it is appreciated that the at least one mono-substituted succinic anhydride and the at least one mono-substituted succinic acid may comprise the same or different substituent.

In one embodiment of the present invention, the succinic acid molecule of the at least one mono-substituted succinic acid and the succinic anhydride molecule of the at least one mono-substituted succinic anhydride are mono-substituted with the same group selected from any linear, branched, aliphatic and cyclic group having a total amount of carbon atoms from C2 to C30, preferably from C3 to C25 and most preferably from C4 to C20 in the substituent.

If the at least one mono-substituted succinic anhydride is provided in combination with at least one mono-substituted succinic acid, the at least one mono-substituted succinic acid is present in an amount of ≤10 mol.-%, based on the molar sum of the at least one mono-substituted succinic anhydride and the at least one mono-substituted succinic acid. For example, the at least one mono-substituted succinic acid is present in an amount of ≤5 mol.-%, preferably of ≤2.5 mol.-% and most preferably of ≤1 mol.-%, based on the molar sum of the at least one mono-substituted succinic anhydride and the at least one mono-substituted succinic acid.

In one embodiment of the present invention, at least one mono-substituted succinic anhydride and at least one mono-substituted succinic acid are provided in process step b).

If the at least one mono-substituted succinic anhydride is provided in combination with the at least one mono-substituted succinic acid in process step b), the at least one mono-substituted succinic anhydride and the at least one mono-substituted succinic acid are preferably provided as a blend.

In order to achieve an improved flowability of the final product and its improved dispersion in the polymer matrix of a polymer composition, it is appreciated that the at least one mono-substituted succinic anhydride is provided in a total amount of from 0.1 to 3 wt.-%, based on the total dry weight of the at least one calcium carbonate-containing filler material.

For example, the at least one mono-substituted succinic anhydride is provided in an amount of from 0.1 to 2.5 wt.-%, preferably in an amount of from 0.2 to 2 wt.-%, more preferably in an amount of from 0.3 to 1.5 wt.-%, even more preferably in an amount of from 0.3 to 1 wt.-% and most preferably in an amount of from 0.3 to 0.8 wt.-% based on the total dry weight of the at least one calcium carbonate-containing filler material.

If the at least one mono-substituted succinic anhydride is provided in combination with the at least one mono-substituted succinic acid in process step b), the at least one mono-substituted succinic anhydride and the optional at least one mono-substituted succinic acid are preferably provided in a total amount of from 0.1 to 3 wt.-%, preferably from 0.1 to 2.5 wt.-%, more preferably from 0.2 to 2 wt.-%, even more preferably from 0.3 to 1.5 wt.-%, still more preferably from 0.3 to 1 wt.-% and most preferably from 0.3 to 0.8 wt.-% based on the total dry weight of the at least one calcium carbonate-containing filler material.

Additionally or alternatively, the at least one mono-substituted succinic anhydride and the optional at least one mono-substituted succinic acid of the present invention are preferably provided in a quantity such that the total weight of said at least one mono-substituted succinic anhydride and the optional at least one mono-substituted succinic acid on the surface of the at least one calcium carbonate-containing filler material is less than 5 mg/m$^2$ of the at least one calcium carbonate-containing filler material provided in step a).

In one embodiment of the present invention, the at least one mono-substituted succinic anhydride and the optional at least one mono-substituted succinic acid of the present invention are preferably provided in a quantity such that the total weight of said at least one mono-substituted succinic anhydride and mono-substituted succinic acid and/or salty reaction product(s) thereof on the surface of the at least one calcium carbonate-containing filler material is less than 4.5 mg/m$^2$ and most preferably less than 4.0 mg/m$^2$ of the at least one calcium carbonate-containing filler material provided in step a).

For example, the at least one mono-substituted succinic anhydride and the optional at least one mono-substituted succinic acid of the present invention are preferably provided in a quantity such that the total weight of the at least one mono-substituted succinic anhydride and the optional at least one mono-substituted succinic acid on the surface of the surface treated filler material product is from 0.1 to 5 mg/m$^2$, more preferably from 0.2 to 4 mg/m$^2$ and most preferably from 1 to 4 mg/m² of the at least one calcium carbonate-containing filler material provided in step a).

Additionally or alternatively, it is to be noted that the at least one mono-substituted succinic anhydride of step b) and the optional at least one mono-substituted succinic acid of the inventive process is/are provided in a molten or liquid state, i.e. said at least one mono-substituted succinic anhydride, and the optional at least one mono-substituted succinic acid, feature(s) a viscosity of less than 5 000, preferably of less than 2 500, more preferably of less than 1.000 mPa·s and most preferably of less than 500 mPa·s at +20° C. (±2° C.), when measured with the appropriate equipment e.g. Physica MCR 300 Rheometer (Paar Physica) equipped with the measuring cell TEZ 150 P-C and the CC 28.7 measuring system at a shear rate of 5 s$^{-1}$ and at +20° C. (±2° C.).

Characterization of Step c): Provisio of a Mixture of Aliphatic Linear or Branched Carboxylic Acids Comprising Stearic Acid According to step c) of the process of the present invention a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24 is provided.

The term "mixture" of aliphatic linear or branched carboxylic acids means that two or more aliphatic linear or branched carboxylic acids are provided in step c) of the present invention, with the proviso that one of the two or more aliphatic linear or branched carboxylic acids is stearic acid. Preferably, the mixture comprises three or more, e.g. three or four or five, aliphatic linear or branched carboxylic acids, with the proviso that one of the three or more aliphatic linear or branched carboxylic acids is stearic acid.

It has been specifically found out that the surface treatment of a calcium carbonate-containing filler material with mono-substituted succinic anhydride(s) and a mixture of aliphatic linear or branched carboxylic acids comprising stearic acid is advantageous for improving the flowability of the calcium carbonate-containing filler material, compared to a material that has been surface treated with mono-substituted succinic anhydride(s) only, i.e. without the mixture of aliphatic linear or branched carboxylic acids comprising stearic acid. A further advantage is that the dispersion of the resulting product in the polymer matrix in a polymer composition is improved, compared to a material that has been surface treated with mono-substituted succinic anhydride(s) only, i.e. without the mixture of aliphatic linear or branched carboxylic acids comprising stearic acid.

Thus, it is one requirement of the present invention that a mixture of aliphatic linear or branched carboxylic acids is provided in step c). It has been specifically found out that a mixture of aliphatic linear or branched carboxylic acids comprising stearic acid is advantageous for the purposes of the present invention.

Thus, it is one specific requirement of the present invention that the mixture of aliphatic linear or branched carboxylic acids comprises stearic acid in an amount of at least 10.0 wt.-%, e.g. from 10.0 to 98.0 wt.-%, based on the total weight of the mixture, and one or more further saturated aliphatic linear or branched carboxylic acid(s) having a total amount of carbon atoms from C8 to C24.

In one embodiment, the mixture of aliphatic linear or branched carboxylic acids comprises stearic acid in an amount of at least 20.0 wt.-%, e.g. from 20.0 to 98.0 wt.-%, preferably of at least 30.0 wt.-%, e.g. from 30.0 to 98.0 wt.-%, more preferably of at least 40.0 wt.-%, e.g. from 40.0 to 98.0 wt.-%, and most preferably of at least 50 wt.-%, e.g. from 50.0 to 98.0 wt.-%, based on the total weight of the mixture, and one or more further saturated aliphatic linear or branched carboxylic acid(s) having a total amount of carbon atoms from C8 to C24. Accordingly, the mixture comprises the one or more further saturated aliphatic linear or branched carboxylic acid(s) having a total amount of carbon atoms from C8 to C24 in an amount of equal or less than 90.0 wt.-%, e.g. from 2.0 to 90.0 wt.-%, preferably of equal or less than 80.0 wt.-%, e.g. from 2.0 to 80.0 wt.-%, more preferably of equal or less than 70.0 wt.-%, e.g. from 2.0 to 70.0 wt.-%, even more preferably of equal or less than 60.0 wt.-%, e.g. from 2.0 to 60.0 wt.-%, and most preferably of equal or less than 50.0 wt.-%, e.g. from 2.0 to 50.0 wt.-%, based on the total weight of the mixture.

It is appreciated that the one or more further saturated aliphatic linear or branched carboxylic acid(s) of the mixture of aliphatic linear or branched carboxylic acid(s) in the meaning of the present invention may be selected from one or more straight chain, branched chain, saturated, unsaturated and/or alicyclic carboxylic acids. Preferably, the one or more further saturated aliphatic linear or branched carboxylic acid(s) of the mixture of aliphatic linear or branched carboxylic acid(s) is/are monocarboxylic acid(s), i.e. the one or more further aliphatic linear or branched carboxylic acid(s) is/are characterized in that a single carboxyl group is present. Said carboxyl group is placed at the end of the carbon skeleton.

Thus, the mixture of saturated aliphatic linear or branched carboxylic acids of step c) comprises stearic acid and one or more further saturated aliphatic linear or branched carboxylic acid(s) having a total amount of carbon atoms from C8 to C24.

Preferably, the mixture of saturated aliphatic linear or branched carboxylic acids of step c) comprises stearic acid and one or more further saturated aliphatic linear or branched carboxylic acid(s) having a total amount of carbon atoms from C8 to C22, more preferably from C10 to C22, even more preferably from C12 to C20 and most preferably from C14 to C20.

In one embodiment of the present invention, the one or more further saturated aliphatic linear or branched carboxylic acid(s) of the mixture of aliphatic linear or branched carboxylic acid(s) is/are selected from saturated unbranched carboxylic acids, that is to say the one or more further saturated aliphatic linear or branched carboxylic acid(s) of the mixture of aliphatic linear or branched carboxylic acid(s) is/are preferably selected from the group of carboxylic acids consisting of octanoic acid, nonanoic acid, decanoic acid, undecanoic acid, lauric acid, tridecanoic acid, myristic acid, pentadecanoic acid, palmitic acid, heptadecanoic acid, nonadecanoic acid, arachidic acid, heneicosanoic acid, behenic acid, tricosanoic acid, lignoceric acid and mixtures thereof.

In another embodiment of the present invention, the one or more further saturated aliphatic linear or branched carboxylic acid(s) of the mixture of aliphatic linear or branched carboxylic acid(s) is/are selected from the group comprising octanoic acid, decanoic acid, lauric acid, myristic acid, palmitic acid, arachidic acid and mixtures thereof. Preferably, the one or more further saturated aliphatic linear or branched carboxylic acid(s) of the mixture of aliphatic linear or branched carboxylic acid(s) is/are selected from the group comprising myristic acid, palmitic acid and mixtures thereof.

In one embodiment, the mixture of saturated aliphatic linear or branched carboxylic acids of step c) comprises stearic acid and one or more further saturated aliphatic linear or branched carboxylic acid(s) selected from the group comprising octanoic acid, decanoic acid, lauric acid, myristic acid, palmitic acid, arachidic acid and mixtures thereof. Preferably, the mixture of saturated aliphatic linear or branched carboxylic acids of step c) comprises stearic acid and one or more further saturated aliphatic linear or branched carboxylic acid(s) selected from the group comprising myristic acid, palmitic acid and mixtures thereof.

If the mixture of saturated aliphatic linear or branched carboxylic acids of step c) comprises stearic acid and one or more further saturated aliphatic linear or branched carboxylic acid(s) selected from the group comprising myristic acid, palmitic acid and mixtures thereof, it is appreciated that the mixture comprises stearic acid and myristic acid and/or palmitic acid in amount of at least 60.0 wt.-%, preferably of at least 70.0 wt.-%, more preferably of at least 80.0 wt.-% and most preferably of at least 90 wt.-%, such as from 90.0 to 99.0 wt.-%, based on the total weight of the mixture. Thus, it is not excluded that the mixture of saturated aliphatic linear or branched carboxylic acids of step c) comprises further saturated aliphatic linear or branched carboxylic acid(s) in minor amounts, i.e. each further saturated aliphatic linear or branched carboxylic acid is present in the mixture in an amount not exceeding 3.0 wt.-%, preferably not exceeding 2.0 wt.-%, and most preferably not exceeding 1.0 wt.-%, based on the total weight of the mixture.

In order to achieve an improved flowability of the final product and its improved dispersion in the polymer matrix of a polymer composition, it is appreciated that the mixture of saturated aliphatic linear or branched carboxylic acids of step c), comprising stearic acid the and one or more further saturated aliphatic linear or branched carboxylic acid(s) having a total amount of carbon atoms from C8 to C24, is provided in a total amount of from 0.1 to 3 wt.-%, based on the total dry weight of the at least one calcium carbonate-containing filler material.

For example, the mixture of saturated aliphatic linear or branched carboxylic acids of step c), comprising stearic acid the and one or more further saturated aliphatic linear or branched carboxylic acid(s) having a total amount of carbon atoms from C8 to C24, is provided in an amount of from 0.1 to 2.5 wt.-%, preferably in an amount of from 0.2 to 2 wt.-%, more preferably in an amount of from 0.3 to 1.5 wt.-%, even more preferably in an amount of from 0.3 to 1 wt.-% and most preferably in an amount of from 0.3 to 0.8 wt.-% based on the total dry weight of the at least one calcium carbonate-containing filler material.

Additionally or alternatively, the mixture of saturated aliphatic linear or branched carboxylic acids of step c) is preferably provided in a quantity such that the total weight of said mixture of saturated aliphatic linear or branched carboxylic acids, comprising stearic acid the and one or more further saturated aliphatic linear or branched carboxylic acid(s) having a total amount of carbon atoms from C8 to C24, and/or salty reaction product(s) thereof on the surface of the at least one calcium carbonate-containing filler material is less than 5 mg/m$^2$ of the at least one calcium carbonate-containing filler material provided in step a).

In one embodiment of the present invention, the mixture of saturated aliphatic linear or branched carboxylic acids of step c), comprising stearic acid the and one or more further saturated aliphatic linear or branched carboxylic acid(s) having a total amount of carbon atoms from C8 to C24, is preferably provided in a quantity such that the total weight of said mixture of saturated aliphatic linear or branched carboxylic acids and/or salty reaction product(s) thereof on the surface of the at least one calcium carbonate-containing filler material is less than 4.5 mg/m$^2$ and most preferably less than 4.0 mg/m$^2$ of the at least one calcium carbonate-containing filler material provided in step a).

For example, the mixture of saturated aliphatic linear or branched carboxylic acids of step c) is preferably provided in a quantity such that the total weight of the mixture of saturated aliphatic linear or branched carboxylic acids and/or salty reaction product(s) thereof on the surface of the surface treated filler material product is from 0.1 to 5 mg/m$^2$, more preferably from 0.2 to 4 mg/m$^2$ and most preferably from 1 to 4 mg/m$^2$ of the at least one calcium carbonate-containing filler material provided in step a).

Characterization of Step d): Contacting of the at Least One Calcium Carbonate-Containing Filler Material with the at Least One Mono-Substituted Succinic Anhydride and the Mixture of Aliphatic Linear or Branched Carboxylic Acids Comprising Stearic Acid According to step d) of the inventive process, the surface of the at least one calcium carbonate-containing filler material of step a) is contacted, under mixing, in one or more steps, in any order, with the at least one mono-substituted succinic anhydride of step b) and the mixture of aliphatic linear or branched carboxylic acids of step c) such that a treatment layer comprising the at least one mono-substituted succinic anhydride and/or salty reaction product(s) thereof and the mixture of aliphatic linear or branched carboxylic acids and/or salty reaction product(s) thereof is formed on the surface of said at least one calcium carbonate-containing filler material of step a).

Step d) of contacting the at least one calcium carbonate-containing filler material with the at least one mono-substituted succinic anhydride and the mixture of aliphatic linear or branched carboxylic acids takes place under mixing conditions. The skilled man will adapt these mixing conditions (such as the configuration of mixing pallets and mixing speed) according to his process equipment.

In one preferred embodiment of the present invention, the inventive process may be a continuous process. In this case, it is possible to contact the at least one calcium carbonate-containing filler material with the at least one mono-substituted succinic anhydride and the mixture of aliphatic linear or branched carboxylic acids in a constant flow, so that a constant concentration of the at least one mono-substituted succinic anhydride and the mixture of aliphatic linear or branched carboxylic acids is provided during step d).

Alternatively, the at least one calcium carbonate-containing filler material is contacted with the at least one mono-substituted succinic anhydride and the mixture of aliphatic linear or branched carboxylic acids in one step, wherein said at least one mono-substituted succinic anhydride and the mixture of aliphatic linear or branched carboxylic acids is preferably added in one portion.

In another embodiment of the present invention, the inventive process may be a batch process, i.e. the at least one calcium carbonate-containing filler material is contacted with the at least one mono-substituted succinic anhydride and the mixture of aliphatic linear or branched carboxylic acids in more than one step, wherein said at least one mono-substituted succinic anhydride and the mixture of aliphatic linear or branched carboxylic acids are preferably added in about equal portions. Alternatively, it is also possible to add the at least one mono-substituted succinic anhydride and the mixture of aliphatic linear or branched carboxylic acids in unequal portions to the at least one calcium carbonate-containing filler material, i.e. in larger and smaller portions.

According to one embodiment of the present invention, contacting step d) is carried out in a batch or continuous process for a period of time from 0.1 to 1000 s. For example, contacting step d) is a continuous process and comprises one or several contacting steps and the total contacting time is from 0.1 to 20 s, preferably from 0.5 to 15 s and most preferably from 1 to 10 s.

It is appreciated that contacting step d) can be carried out in any order. For example, contacting step d) is carried out in that the at least one mono-substituted succinic anhydride of step b) and the mixture of saturated aliphatic linear or branched carboxylic acids of step c) are added simultaneously to the at least one calcium carbonate-containing filler material. In this embodiment, the at least one mono-substituted succinic anhydride of step b) and the mixture of saturated aliphatic linear or branched carboxylic acids of step c) are preferably added as a blend to the at least one calcium carbonate-containing filler material.

Alternatively, the mixture of saturated aliphatic linear or branched carboxylic acids of step c) is added before or after the at least one mono-substituted succinic anhydride of step b).

It is appreciated that the advantageous effect are especially obtained if the mixture of saturated aliphatic linear or branched carboxylic acids of step c) is added after the at least one mono-substituted succinic anhydride of step b).

It is appreciated that the at least one mono-substituted succinic anhydride and the mixture of saturated aliphatic linear or branched carboxylic acids should feature a workable viscosity, i.e. the at least one mono-substituted succinic anhydride and the mixture of saturated aliphatic linear or branched carboxylic acids should be in a molten or in a liquid state.

Thus, it is required that the temperature before and/or during contacting step d) is adjusted such that the at least one mono-substituted succinic anhydride and the mixture of aliphatic linear or branched carboxylic acids is in a molten or liquid state.

In general, contacting step d) is carried out at a treatment temperature of from 20 to 200° C., preferably of from 40 to 150° C. and most preferably of from 60 to 130° C.

Preferably, if the at least one mono-substituted succinic anhydride and the mixture of aliphatic linear or branched carboxylic acids is provided in a liquid state, i.e. under standard ambient temperature and pressure (SATP) which refers to a temperature of 298.15 K (25° C.) and an absolute pressure of exactly 100 000 Pa (1 bar, 14.5 psi, 0.98692 atm), it is appreciated that contacting step d) can be carried out at room temperature, or a temperature above room temperature, i.e. from 20 to 200° C., preferably of from 20 to 150° C. and most preferably of from 20 to 130° C.

If the at least one mono-substituted succinic anhydride and/or the mixture of aliphatic linear or branched carboxylic acids is/are provided in a molten state, it is appreciated that the temperature before and/or during contacting step d) is adjusted such that the temperature is at least 2° C. above the melting point of the at least one mono-substituted succinic anhydride and/or the mixture of aliphatic linear or branched carboxylic acids. For example, the temperature before contacting step d) is adjusted such that the temperature is at least 2° C. above the melting point of the at least one mono-substituted succinic anhydride and/or the mixture of aliphatic linear or branched carboxylic acids. Alternatively, the temperature before and during contacting step d) is adjusted such that the temperature is at least 2° C. above the melting point of the at least one mono-substituted succinic anhydride and/or the mixture of aliphatic linear or branched carboxylic acids.

It is appreciated that the wording "melting point of the at least one mono-substituted succinic anhydride and/or the mixture of aliphatic linear or branched carboxylic acids" refers to the melting point of the at least one mono-substituted succinic anhydride or the mixture of aliphatic linear or branched carboxylic acids, or to the blend comprising the at least one mono-substituted succinic anhydride and the mixture of aliphatic linear or branched carboxylic acids.

In one embodiment of the present invention, the temperature before and/or during contacting step d) is adjusted such that the temperature is at least 5° C., preferably, at least 8° C. and most preferably at least 10° C. above the melting point of the at least one mono-substituted succinic anhydride and/or the mixture of aliphatic linear or branched carboxylic acids. For example, the temperature before and/or during contacting step d) is adjusted such that the temperature is from 2 to 50° C., preferably from 5 to 40° C., more preferably from 8 to 30° C. and most preferably from 10 to 20° C. above the melting point of the at least one mono-substituted succinic anhydride and/or the mixture of aliphatic linear or branched carboxylic acids.

In one embodiment of the present invention, the contacting of the at least one calcium carbonate-containing filler material with the at least one mono-substituted succinic anhydride and the mixture of aliphatic linear or branched carboxylic acids is thus carried out at a treatment temperature of below 200° C. For example, the contacting of at least one calcium carbonate-containing filler material with the at least one mono-substituted succinic anhydride and the mixture of aliphatic linear or branched carboxylic acids is carried out at a treatment temperature of from 20 to 200° C., preferably of from 40 to 150° C. and most preferably of from 60 to 130° C.

The treatment time for carrying out the contacting of the at least one calcium carbonate-containing filler material with the at least one mono-substituted succinic anhydride and the mixture of aliphatic linear or branched carboxylic acids is carried out for a period of 1 000 s or less, preferably for a period of 500 s or less, more preferably for a period of 250 s or less and most preferably from 0.1 to 1 000 s. For example, contacting step d) is carried out for a period of time from 0.1 to 20 s, preferably from 0.5 to 15 s and most preferably from 1 to 10 s. In general, the length of contacting the at least one calcium carbonate-containing filler material with the at least one mono-substituted succinic anhydride and the mixture of aliphatic linear or branched carboxylic acids is determined by the treatment temperature applied during said contacting. For example, where a treatment temperature of about 200° C. is applied, the treatment time is as short as, for example, about 0.1 s. If a treatment temperature of about 90° C. is applied, the treatment time can be as long as, for example, about 1 000 s.

It is appreciated that the at least one mono-substituted succinic anhydride and the mixture of aliphatic linear or branched carboxylic acids are added in contacting step d) in a total amount of from 0.1 to 6 wt.-%, based on the total dry weight of the at least one calcium carbonate-containing filler material of step a). For example, the at least one mono-substituted succinic anhydride and the mixture of aliphatic linear or branched carboxylic acids are added in contacting step d) in an amount of from 0.3 to 4.0 wt.-% or of from 0.6 to 3.0 wt.-%, based on the total dry weight of the at least one calcium carbonate-containing filler material of step a).

The ratio of the at least one mono-substituted succinic anhydride and the mixture of aliphatic linear or branched carboxylic acids added in contacting step d) can be varied in a great range. However, it is preferred that contacting step d) is carried out in that the at least one mono-substituted succinic anhydride of step b) and the mixture of saturated aliphatic linear or branched carboxylic acids of step c) are added in a weight ratio [succinic anhydride/mixture of carboxylic acids] of from 10:1 to 1:10. Preferably, contacting step d) is carried out in that the at least one mono-substituted succinic anhydride of step b) and the mixture of saturated aliphatic linear or branched carboxylic acids of step c) are added in a weight ratio [succinic anhydride/mixture of carboxylic acids] of from 5:1 to 1:5 and most preferably from 4:1 to 1:4.

It is appreciated that advantageous results regarding the flowability as well as the dispersion of the surface treated filler material product in the polymer matrix of a polymer composition are achieved if the at least one mono-substituted succinic anhydride of step b) is added in excess compared to the mixture of saturated aliphatic linear or branched carboxylic acids of step c) or if the at least one mono-substituted succinic anhydride of step b) and the mixture of saturated aliphatic linear or branched carboxylic acids of step c) are added in equal amounts. Thus, it is preferred that contacting step d) is carried out in that the at least one mono-substituted succinic anhydride of step b) and the mixture of saturated aliphatic linear or branched carboxylic acids of step c) are added in a weight ratio [succinic anhydride/mixture of carboxylic acids] of from 4:1 to 1:1.

In one embodiment of the present invention, the at least one calcium carbonate-containing filler material is preheated, i.e. activated, before contacting step d) is carried out. That is to say, the at least one calcium carbonate-containing filler material is treated at a temperature of from 20 to 200° C., preferably of from 40 to 200° C., more preferably of from 50 to 150° C. and most preferably of from 60 to 130° C. before contacting step d) is carried out.

The treatment time for carrying out the preheating of the at least one calcium carbonate-containing filler material is carried out for a period of 30 min or less, preferably for a period of 20 min or less and more preferably for a period of 15 min or less.

In one embodiment of the present invention, the preheating of the at least one calcium carbonate-containing filler material is carried out at a temperature that is of about equal to the temperature implemented during contacting step d).

The term "equal" temperature in the meaning of the present invention refers to a preheating temperature that is at most 20° C., preferably at most 15° C., more preferably 10° C. and most preferably at most 5° C. below or above the temperature implemented during contacting step d).

Thus, it is appreciated that the treatment layer formed on the surface of the at least one calcium carbonate-containing filler material comprises the at least one mono-substituted succinic anhydride provided in step b) and/or salty reaction product(s) thereof obtained as reaction product from contacting the calcium carbonate-containing filler material with the at least one mono-substituted succinic anhydride of step b). In such a case, the treatment layer of the surface treated filler material product preferably further comprises salty reaction product(s) of the at least one mono-substituted succinic anhydride formed on the surface of said at least one calcium carbonate-containing filler material in step c). For example, salty reaction product(s) such as one or more calcium salts and/or magnesium salts of the at least one mono-substituted succinic anhydride.

Additionally, the treatment layer formed on the surface of the at least one calcium carbonate-comprising filler material comprises the mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24 and salty reaction product(s) thereof obtained from contacting the at least one calcium carbonate-comprising filler material with the mixture of aliphatic linear or branched carboxylic acids of step c). In such a case, the treatment layer of the surface treated filler material product preferably further comprises salty reaction product(s) of the mixture of aliphatic linear or branched carboxylic acids formed on the surface of said at least one calcium carbonate-containing filler material in step c). For example, salty reaction product(s) such as one or more calcium salts and/or magnesium salts of the mixture of aliphatic linear or branched carboxylic acids.

The treatment layer is preferably characterized in that the total weight of the at least one mono-substituted succinic anhydride and and/or salty reaction product(s) thereof as well as the mixture of aliphatic linear or branched carboxylic acids and/or salty reaction product(s) thereof on the surface of the surface treated filler material is from 0.2 to 10 mg/m$^2$, more preferably from 0.4 to 8 mg/m$^2$ and most preferably from 2 to 8 mg/m$^2$ of the at least one calcium carbonate-comprising filler material.

The treatment layer is preferably characterized in that the total weight of the at least one mono-substituted succinic anhydride and/or salty reaction product(s) thereof as well as the mixture of aliphatic linear or branched carboxylic acids and/or salty reaction product(s) thereof on the surface of the surface treated filler material is from 0.1 to 2 wt.-%/m$^2$, more preferably from 0.2 to 1 wt.-%/m$^2$ and most preferably from 0.3 to 0.5 wt.-%/m$^2$ of the at least one calcium carbonate-comprising filler material.

It is further appreciated that the obtained surface treated filler material comprises the treatment layer in an amount of from 0.2 to 6 wt.-%, preferably in an amount of from 0.2 to 5 wt.-%, more preferably in an amount of from 0.2 to 4 wt.-%, even more preferably in an amount of from 0.2 to 3 wt.-%, even more preferably in an amount of from 0.2 to 2 wt.-% and most preferably in an amount of from 0.4 to 1.6 wt.-% based on the total dry weight of the at least one calcium carbonate-comprising filler material.

Thus, it is appreciated that the at least one calcium carbonate-containing filler material product obtained in process step d) comprises, preferably consists of, at least one calcium carbonate-containing filler material and a treatment layer comprising the at least one mono-substituted succinic anhydride and/or salty reaction product(s) thereof as well as the mixture of aliphatic linear or branched carboxylic acids and/or salty reaction product(s). The treatment layer is formed on the surface of said at least one calcium carbonate-containing filler material of step a).

Additionally or alternatively, the treatment layer of the surface treated filler material product comprises the at least one mono-substituted succinic anhydride and/or salty reaction product(s) thereof in a specific molar ratio. For example, the molar ratio of the at least one mono-substituted succinic anhydride to the salty reaction product(s) thereof is from 99.9:0.1 to 0.1:99.9, preferably from 70:30 to 90:10.

The wording "molar ratio of the at least one mono-substituted succinic anhydride to the salty reaction product(s) thereof" in the meaning of the present invention refers to the sum of the molecular weight of the at least one mono-substituted succinic anhydride to the sum of the molecular weight of the mono-substituted succinic anhydride molecules in the salty reaction products thereof.

Additionally or alternatively, the treatment layer of the surface treated filler material product comprises the mixture of aliphatic linear or branched carboxylic acids and/or salty reaction product(s) thereof in a specific molar ratio. For example, the molar ratio of the mixture of aliphatic linear or branched carboxylic acids to the salty reaction product(s) thereof is from 99.9:0.1 to 0.1:99.9, preferably from 70:30 to 90:10.

The wording "molar ratio of the mixture of aliphatic linear or branched carboxylic acids to the salty reaction product(s) thereof" in the meaning of the present invention refers to the sum of the molecular weight of the mixture of aliphatic linear or branched carboxylic acids to the sum of the molecular weight of the mixture of aliphatic linear or branched carboxylic acid molecules in the salty reaction products thereof.

In one embodiment, the surface treated filler material product obtained in step d) is dried. This optional step is preferably carried out in order to reduce the moisture content of the surface treated filler material product obtained. Thus, the dried surface treated filler material product obtained in step e) has a moisture content that is below the moisture content of the surface treated filler material product obtained before the drying step, i.e. after step d).

According to one embodiment of the present invention, the method thus comprises a further step e) of drying the surface treated filler material product obtained in step d).

For example, optional drying step e) is carried out at a temperature in the range from 60 to 180° C., preferably from 50 to 150° C., more preferably from 60 to 120° C. and most preferably from 80 to 120° C., at ambient or reduced pressure until the moisture content of the obtained surface treated filler material product obtained is reduced.

In one embodiment, optional drying step e) is carried out until the moisture content of the obtained surface treated filler material product is in the range from 0.001 to 20 wt.-%, preferably from 0.005 to 15 wt.-%, more preferably from 0.01 to 10 wt.-% and most preferably from 0.05 to 5 wt.-%, based on the total weight of the surface-reacted calcium carbonate.

It is appreciated that optional drying step e) can be carried out at ambient pressure or at reduced pressure. Preferably, the drying is carried out at ambient pressure.

Thus, optional drying step e) is preferably carried out at a temperature in the range from 60 to 180° C. at ambient pressure. For example, optional drying step e) is carried out at a temperature in the range from 50 to 150° C., preferably from 60 to 120° C. and more preferably from 80 to 120° C. at ambient pressure.

According to one embodiment, the present invention thus refers to a process for preparing a surface treated filler material product with mono-substituted succinic anhydride(s) and a mixture of aliphatic linear or branched carboxylic acids comprising stearic acid, the process comprising the steps of:
  a) providing at least one calcium carbonate-containing filler material,
  b) providing at least one mono-substituted succinic anhydride,
  c) providing a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24,
  d) contacting the surface of the at least one calcium carbonate-containing filler material of step a), under mixing, in one or more steps, in any order, with the at least one mono-substituted succinic anhydride of step b) and the mixture of aliphatic linear or branched carboxylic acids of step c) such that a treatment layer comprising the at least one mono-substituted succinic anhydride and/or salty reaction product(s) thereof and the mixture of aliphatic linear or branched carboxylic acids and/or salty reaction product(s) thereof is formed on the surface of said at least one calcium carbonate-containing filler material of step a), and
  e) drying the surface treated filler material product obtained in step d), wherein the temperature before and/or during contacting step d) is adjusted such that the at least one mono-substituted succinic anhydride and the mixture of aliphatic linear or branched carboxylic acids is in a molten or liquid state.

The resulting surface treated filler material product obtained according to the present invention has excellent flowability characteristics as well as dispersion characteristics in the polymer matrix of a polymer composition in comparison to mineral fillers treated with at least one mono-substituted succinic anhydride only, i.e. without the implementation of the mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24.

In particular, the obtained surface treated filler material product has, when measuring powder flowability with the shear cell method on a FT4 powder Rheometer (ASTM D7891-15) with a pre-shear normal stress of 15 kPa, an unconfined yield strength (UYS) which is decreased by at least 7%, preferably from 7 to 30%, more preferably at least 10%, and most preferably from 10 to 30%, or a flow factor (FF) which is increased by at least 7%, preferably from 7 to 30%, more preferably at least 10%, and most preferably from 10 to 30%, and/or, when measuring powder flowability via the stability and variable flow rate method on a FT4 powder Rheometer, a basic flowability energy (BFE) which is decreased by at least 7%, preferably from 7 to 30%, more preferably at least 10%, and most preferably from 10 to 30%, in comparison to the same surface treated filler material product treated with the at least one mono-substituted succinic anhydride only, i.e. without the implementation of the mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24. It is appreciated that the FT4 powder Rheometer (Freeman Technology, UK) was equipped with the Powder Rheometer software (v 5.000.00012) and Freeman Technology Data Analysis Software version 4.0.17.

In view of the very good results obtained, a surface treated filler material product is provided comprising
  a) at least one calcium carbonate-containing filler material,
  b) a treatment layer on the surface of the at least one calcium carbonate-containing filler material comprising at least one mono-substituted succinic anhydride and/or salty reaction product(s) thereof and a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof, wherein the surface treated filler material product comprises the treatment layer in an amount of from 0.2 to 6 wt.-%, based on the total dry weight of the at least one calcium carbonate-containing filler material.

With regard to the definition of the at least one calcium carbonate-containing filler material, the at least one mono-substituted succinic anhydride, the salty reaction product(s) thereof, the mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, the salty reaction product(s) thereof, the surface treated filler material product, and preferred embodiments thereof, reference is made to the comments provided above when discussing process steps a), b), c) and d).

It is preferred that the surface treated filler material product is in form of a powder.

In one embodiment of the present invention, the surface treated filler material product is obtainable (or obtained) by the process of the present invention.

Thus, the surface treated filler material product is provided comprising a) at least one calcium carbonate-containing filler material,
b) a treatment layer on the surface of the at least one calcium carbonate-containing filler material comprising at least one mono-substituted succinic anhydride and/or salty reaction product(s) thereof and a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof, wherein the surface treated filler material product comprises the treatment layer in an amount of from 0.2 to 6 wt.-%, based on the total dry weight of the at least one calcium carbonate-containing filler material, the surface treated filler material product is obtainable (or obtained) by a process for preparing a surface treated filler material product with mono-substituted succinic anhydride(s) and a mixture of aliphatic linear or branched carboxylic acids comprising stearic acid, the process comprising at least the steps of:

a) providing at least one calcium carbonate-containing filler material,
b) providing at least one mono-substituted succinic anhydride,
c) providing a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24,
d) contacting the surface of the at least one calcium carbonate-containing filler material of step a), under mixing, in one or more steps, in any order, with the at least one mono-substituted succinic anhydride of step b) and the mixture of aliphatic linear or branched carboxylic acids of step c) such that a treatment layer comprising the at least one mono-substituted succinic anhydride and/or salty reaction product(s) thereof and the mixture of aliphatic linear or branched carboxylic acids and/or salty reaction product(s) thereof is formed on the surface of said at least one calcium carbonate-containing filler material of step a), wherein the temperature before and/or during contacting step d) is adjusted such that the at least one mono-substituted succinic anhydride and the mixture of aliphatic linear or branched carboxylic acids is in a molten or liquid state.

The surface treated filler material product thus obtained is advantageously implemented in a polymer composition comprising at least one polymeric resin and from 1 to 95 wt.-% of the surface treated filler material product.

In a further aspect, the present invention thus refers to a polymer composition comprising at least one polymeric resin and from 1 to 95 wt.-%, based on the total weight of the polymer composition, of the surface treated filler material product.

Accordingly, the polymer composition comprises at least one polymeric resin. The polymeric resin represents the backbone of the composition and provides strength, flexibility, toughness and durability to the final fiber and/or filament and/or film and/or thread and/or sheet and/or pipe and/or profile and/or mold and/or injection mold and/or blow mold.

It is appreciated that the at least one polymeric resin according to the present invention is not restricted to a specific resin material as long as the polymer composition is suitable for the preparation of a fiber and/or filament and/or film and/or thread and/or sheet and/or pipe and/or profile and/or mold and/or injection mold and/or blow mold.

In one embodiment of the present invention, the at least one polymeric resin is at least one thermoplastic polymer. Thus, it is preferred that the at least one polymeric resin is a thermoplastic polymer selected from the group comprising homopolymers and/or copolymers of polyolefins, polyamides, halogen-containing polymers and/or polyesters.

Additionally or alternatively, the at least one polymeric resin is a homopolymer and/or copolymer of a polyolefin. For example, the at least one polymeric resin is a homopolymer and a copolymer of a polyolefin. Alternatively, the at least one polymeric resin is a homopolymer or a copolymer of a polyolefin.

It is appreciated that the at least one polymeric resin is preferably a homopolymer of a polyolefin.

For example, the polyolefin can be polyethylene and/or polypropylene and/or polybutylene. Accordingly, if the polyolefin is polyethylene, the polyolefin is selected from the group comprising homopolymers and/or copolymers of polyethylene like high-density polyethylene (HDPE), medium-density polyethylene (MDPE), low-density polyethylene (LDPE), very low-density polyethylene (VLDPE), linear low-density polyethylene (LLDPE).

For example, the polyolefin is a homopolymer and/or copolymer of polyethylene.

The expression homopolymer of polyethylene used in the present invention relates to polyethylene comprising a polyethylene that consists substantially, i.e. of more than 99.7 wt.-%, still more preferably of at least 99.8 wt.-%, based on the total weight of the polyethylene, of ethylene units. For example, only ethylene units in the homopolymer of polyethylene are detectable.

In case the at least one polymeric resin of the polymer composition comprises a copolymer of polyethylene, it is appreciated that the polyethylene contains units derivable from ethylene as major components. Accordingly, the copolymer of polyethylene comprises at least 55 wt.-% units derivable from ethylene, more preferably at least 60 wt.-% of units derived from ethylene, based on the total weight of the polyethylene. For example, the copolymer of polyethylene comprises 60 to 99.5 wt.-%, more preferably 90 to 99 wt.-%, units derivable from ethylene, based on the total weight of the polyethylene. The comonomers present in such copolymer of polyethylene are C3 to C10 α-olefins, preferably 1-butene, 1-hexene and 1-octene, the latter especially preferred.

Additionally or alternatively, the polyolefin is a homopolymer and/or copolymer of polypropylene.

The expression homopolymer of polypropylene as used throughout the instant invention relates to a polypropylene that consists substantially, i.e. of more than 99 wt.-%, still more preferably of at least 99.5 wt.-%, like of at least 99.8 wt.-%, based on the total weight of the polypropylene, of propylene units. In a preferred embodiment only propylene units are detectable in the homopolymer of polypropylene.

In case the at least one polymeric resin of the polymer composition comprises a copolymer of polypropylene, the polypropylene preferably contains units derivable from propylene as major components. The copolymer of polypropylene preferably comprises, preferably consists of, units derived from propylene and C2 and/or at least one C4 to C10 α-olefin. In one embodiment of the present invention, the copolymer of polypropylene comprises, preferably consists of, units derived from propylene and at least one α-olefin selected from the group consisting of ethylene, 1-butene, 1-pentene, 1-hexene and 1-octene. For example, the copolymer of polypropylene comprises, preferably consists of, units derived from propylene and ethylene. In one embodiment of the present invention, the units derivable from propylene constitutes the main part of the polypropylene, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the polypropylene. The amount of units derived from C2 and/or at least one C4 to C10 α-olefin in the copolymer of polypropylene, is in the range of 1 to 40 wt.-%, more preferably in the range of 1 to 30 wt.-% and most preferably in the range of 1 to 20 wt.-%, based on the total weight of the copolymer of polypropylene.

If the copolymer of polypropylene comprises only units derivable from propylene and ethylene, the amount of ethylene is preferably in the range of 1 to 20 wt.-%, preferably in the range of 1 to 15 wt.-% and most preferably in the range of 1 to 10 wt.-%, based on the total weight of the copolymer of polypropylene. Accordingly, the amount of propylene is preferably in the range of 80 to 99 wt.-%, preferably in the range of 85 to 99 wt.-% and most preferably in the range of 90 to 99 wt.-%, based on the total weight of the copolymer of polypropylene.

Additionally or alternatively, the polyolefin is a homopolymer and/or copolymer of polybutylene.

The expression homopolymer of polybutylene as used throughout the instant invention relates to a polybutylene that consists substantially, i.e. of more than 99 wt.-%, still more preferably of at least 99.5 wt.-%, like of at least 99.8 wt.-%, based on the total weight of the polybutylene, of butylene units. In a preferred embodiment only butylene units are detectable in the homopolymer of polybutylene.

In case the at least one polymeric resin of the polymer composition comprises a copolymer of polybutylene, the polybutylene preferably contains units derivable from butylene as major components. The copolymer of polybutylene preferably comprises, preferably consists of, units derived from butylene and C2 and/or C3 and/or at least one C5 to C10 α-olefin. In one embodiment of the present invention, the copolymer of polybutylene comprises, preferably consists of, units derived from butylene and at least one α-olefin selected from the group consisting of ethylene, 1-propene, 1-pentene, 1-hexene and 1-octene. For example, the copolymer of polybutylene comprises, preferably consists of, units derived from butylene and ethylene. In one embodiment of the present invention, the units derivable from butylene constitutes the main part of the polybutylene, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the polybutylene. The amount of units derived from C2 and/or C3 and/or at least one C5 to C10 α-olefin in the copolymer of polybutylene, is in the range of 1 to 40 wt.-%, more preferably in the range of 1 to 30 wt.-% and most preferably in the range of 1 to 20 wt.-%, based on the total weight of the copolymer of polybutylene.

If the at least one polymeric resin is a homopolymer and/or copolymer of a halogen-containing polymer, the at least one polymeric resin is preferably selected from polyvinylchloride (PVC), polyvinylidene chloride (PVDC), polyvinylidene fluoride (PVDF) and polytetrafluoroethylene (PTFE).

If the at least one polymeric resin is a homopolymer and/or copolymer of polyester, the at least one polymeric resin is preferably selected from polyethylene terephthalate (PET), polytrimethylene terephthalate (PTT), polybutylene terephthalate (PBT), polyethylene aphthalate (PEN), but also degradable polyesters, such as polylactic acid (polylactide, PLA).

In one embodiment of the present invention, the at least one polymeric resin is a homopolymer of polyethylene and/or polypropylene and/or polybutylene. For example, the at least one polymeric resin is a homopolymer of polyethylene and polypropylene. Alternatively, the at least one polymeric resin is a homopolymer of polyethylene or polypropylene. In one embodiment of the present invention, the at least one polymeric resin is a homopolymer of polypropylene.

The expression "at least one" polymeric resin means that one or more kinds of polymeric resin may be present in the inventive polymer composition.

Accordingly, it is appreciated that the at least one polymeric resin may be a mixture of two or more kinds of polymeric resins. For example, if the at least one polymeric resin is a mixture of two or more polymeric resins, one polymeric resin is a homopolymer or copolymer of polypropylene, while the second or further polymeric resin is selected from the group comprising homopolymers and/or copolymers of polyethylene, polybutylene, polyamides, polyesters, halogen-containing polymers and mixtures thereof.

In one embodiment of the present invention, the at least one polymeric resin is one kind of polymeric resin. Preferably, the at least one polymeric resin is a homopolymer of polyethylene or polypropylene.

In one embodiment of the present invention, the at least one polymeric resin has a melting temperature Tm of above 100° C., more preferably of above 150° C., like of above 200° C. For example, the melting temperature of the at least one polymeric resin ranges from 100 to 350° C., more preferably ranges from 150 to 325° C. and most preferably ranges from 200 to 300° C.

Furthermore, it is appreciated that the at least one polymeric resin may be selected from polymeric resins having a broad spectrum of melt flow rate. In general, it is preferred that the at least one polymeric resin has a melt flow rate MFR (190° C.) of from 0.1 to 3 000 g/10 min, more preferably of from 0.2 to 2 500 g/10 min. For example, the at least one polymeric resin has a melt flow rate MFR (190° C.) of from 0.3 to 2 000 g/10 min or from 0.3 to 1 600 g/10 min. Additionally or alternatively, the at least one polymeric resin has a melt flow rate MFR (230° C.) of from 0.1 to 3 000 g/10 min, more preferably of from 0.2 to 2 500 g/10 min. For example, the at least one polymeric resin has a melt flow rate MFR (230° C.) of from 0.3 to 2 000 g/10 min or from 0.3 to 1 600 g/10 min.

For example, if the at least one polymeric resin is a polyolefin being a homopolymer and/or copolymer of polypropylene, it is preferred that the at least one polymeric resin has a melt flow rate MFR (190° C., 2.16 kg) of from 1 to 3 000 g/10 min, more preferably of from 3 to 2 500 g/10 min. For example, the at least one polymeric resin which is a homopolymer and/or copolymer of polypropylene has a melt flow rate MFR (190° C.) of from 5 to 2 000 g/10 min or from 10 to 1 600 g/10 min. It is preferred that the at least one polymeric resin which is a homopolymer and/or copolymer of polypropylene has a melt flow rate MFR (230° C.) of from 1 to 3 000 g/10 min, more preferably of from 3 to 2 500 g/10 min. For example, the at least one polymeric resin which is a homopolymer and/or copolymer of polypropylene has a melt flow rate MFR (230° C.) of from 5 to 2 000 g/10 min or from 10 to 1 600 g/10 min.

If the at least one polymeric resin is a polyolefin being a homopolymer and/or copolymer of polyethylene, it is appreciated that the at least one polymeric resin has a rather low melt flow rate. Accordingly, it is preferred that the at least one polymeric resin which is a homopolymer and/or copolymer of polyethylene has a melt flow rate MFR (190° C.) of from 0.5 to 20 g/10 min, more preferably of from 0.7 to 15 g/10 min. For example, the at least one polymeric resin has a melt flow rate MFR (190° C.) of from 0.9 to 10 g/10 min or from 0.9 to 5 g/10 min. Additionally or alternatively, the at least one polymeric resin which is a homopolymer and/or copolymer of polyethylene has a melt flow rate MFR (230° C.) of from 0.1 to 3 000 g/10 min, more preferably of from 0.2 to 2 500 g/10 min. For example, the at least one polymeric resin which is a homopolymer and/or copolymer of polyethylene has a melt flow rate MFR (230° C.) of from 0.3 to 2 000 g/10 min or from 0.3 to 1 600 g/10 min.

A further essential component of the present polymer composition is the surface treated filler material product. With regard to the definition of the surface treated filler material product and preferred embodiments thereof, reference is made to the comments provided above when discussing process steps a), b), c) and d).

It is one requirement of the present invention that the polymer composition comprises the surface treated filler material product in an amount of 1 to 95 wt.-%, based on the total weight of the polymer composition.

In one embodiment of the present invention, the polymer composition comprises the surface treated filler material product in an amount of from 5 to 95 wt.-% and preferably from 10 to 85 wt.-%, based on the total weight of the polymer composition. For example, the polymer composition comprises the surface treated filler material product in an amount of from 15 to 80 wt.-%, based on the total weight of the polymer composition.

In one embodiment of the present invention, the polymer composition is a masterbatch.

The term "masterbatch" refers to a composition having a concentration of the surface treated filler material product that is higher than the concentration of the polymer composition used for preparing the final application product such as a fiber and/or filament and/or film and/or thread and/or sheet and/or pipe and/or profile and/or mold and/or injection mold and/or blow mold. That is to say, the masterbatch is further diluted such as to obtain a polymer composition which is suitable for preparing the final application product such as a fiber and/or filament and/or film and/or thread and/or sheet and/or pipe and/or profile and/or mold and/or injection mold and/or blow mold.

For example, the masterbatch comprises the surface treated filler material product in an amount of from 50 to 95 wt.-%, preferably from 60 to 85 wt.-% and more preferably from 70 to 80 wt.-%, based on the total weight of the masterbatch.

According to one embodiment of the present invention, the masterbatch is used to produce fibers and/or filaments and/or films and/or threads.

In another embodiment of the present invention, the polymer composition used for preparing the final application product such as fiber and/or filament and/or film and/or thread and/or sheet and/or pipe and/or profile and/or mold and/or, injection mold and/or blow mold comprises the surface treated filler material product in an amount of from 1 to 70 wt.-%, preferably of from 5 to 55 wt.-% and most preferably from 10 to 50 wt.-%, based on the total weight of the polymer composition. For example, the polymer composition used for preparing the final application product such as a fiber and/or filament and/or film comprises the surface treated filler material product in an amount of from 15 to 25 wt.-%, based on the total weight of the polymer composition.

In another embodiment of the present invention, the polymer composition used for preparing the final application product such as a fiber and/or filament and/or film and/or thread and/or sheet and/or pipe and/or profile and/or mold and/or, injection mold and/or blow mold comprises the at least one calcium carbonate-containing material in an amount of from 1 and 10 wt.-%, based on the total weight of the polymer composition. It is appreciated that the polymer composition preferably comprises this amount when it is used as packaging material for acidic food like citrus fruits or containers and/or bottles for fruit juice.

If a masterbatch is used to produce a fiber and/or filament and/or film and/or thread and/or sheet and/or pipe and/or profile and/or mold and/or injection mold and/or blow mold, it is preferred that the masterbatch is diluted such as to obtain a polymer composition suitable for preparing the final application product such as a fiber and/or filament and/or film and/or thread and/or sheet and/or pipe and/or profile and/or mold and/or injection mold and/or blow mold. That is to say, the masterbatch is diluted such as to comprise the surface treated filler material product in an amount of from 1 to 70 wt.-%, preferably of from 5 to 55 wt.-% and most preferably from 10 to 50 wt.-%, based on the total weight of the polymer composition.

According to another embodiment of the present invention, the polymer composition is a fiber and/or filament and/or film and/or thread and/or sheet and/or pipe and/or profile and/or mold and/or injection mold and/or blow mold.

For example, the fiber and/or filament and/or film and/or thread and/or sheet and/or pipe and/or profile and/or mold and/or injection mold and/or blow mold comprises the surface treated filler material product in an amount of from 1 to 70 wt.-%, preferably from 5 to 55 wt.-%, more preferably from 10 to 50 wt.-% and most preferably from 15 to 30 wt.-%, based on the total weight of the fiber and/or filament and/or film and/or thread and/or sheet and/or pipe and/or profile and/or mold and/or injection mold and/or blow mold.

In view of the excellent flowability characteristics of the surface treated filler material product as well as its excellent dispersion in polymer compositions, the surface treated filler material product according to the present invention can be advantageously used in final application products such as a fiber and/or filament and/or film and/or thread and/or sheet and/or pipe and/or profile and/or mold and/or injection mold and/or blow mold. In view of this, the surface treated filler material product imparts excellent mechanical properties to final application products such as a fiber and/or filament and/or film and/or thread and/or sheet and/or pipe and/or profile and/or mold and/or injection mold and/or blow mold, when the surface treated filler material product is provided in form of the polymer composition of the present invention.

Thus, the present invention refers in a further aspect to a fiber and/or filament and/or film and/or thread and/or sheet and/or pipe and/or profile and/or mold and/or injection mold and/or blow mold comprising the polymer composition as defined above and/or the surface treated filler material product as defined above.

Furthermore, the present invention refers in another aspect to a method for preparing a fiber and/or filament and/or film and/or thread and/or sheet and/or pipe and/or profile and/or mold and/or injection mold and/or blow mold, the method comprising at least the steps of:

a) providing the polymer composition as defined above, and
b) subjecting the polymer composition of step a) to conditions under which said polymer composition is converted into a fiber and/or filament and/or film and/or thread and/or sheet and/or pipe and/or profile and/or mold and/or injection mold and/or blow mold.

Appropriate method conditions for preparing a fiber and/or filament and/or film and/or thread and/or sheet and/or pipe and/or profile and/or mold and/or injection mold and/or blow mold are commonly known to the skilled person and/or can be established by routine modifications based on common general knowledge.

For example, the polymer composition of the present invention may advantageously be implemented in a process of mixing and/or extruding and/or compounding and/or blow moulding for preparing a fiber and/or filament and/or film and/or thread and/or sheet and/or pipe and/or profile and/or mold and/or injection mold and/or blow mold, wherein the at least one polymeric resin is preferably a thermoplastic polymer selected from the group comprising homopolymers and/or copolymers of polyolefins, polyamides and/or polyesters.

The term "fiber" in the meaning of the present invention refers to a linear structure forming textile fabrics such as nonwovens which typically consist of fiber webs bonded together by e.g. mechanical methods. Accordingly, the term "fiber" is understood to refer to a finite structure.

The term "thread" in the meaning of the present invention refers to a linear structure forming textile fabrics such as nonwovens which typically consist of thread webs bonded together by e.g. mechanical methods. Accordingly, the term "thread" is understood to refer to a finite structure. The thread may be constructed as mono-, bi- or multi-thread. If a bi- or multi-thread is present, the composition of the single thread may be substantially the same. That is to say, the compositions of the single threads comprise substantially the same components, i.e. the at least one polymeric resin and surface treated filler material product, in the same amounts. Alternatively, the composition of the single threads may be different. That is to say, the compositions of the single threads may comprise the same components, i.e. the at least one polymeric resin and surface treated filler material product, in varying amounts or the compositions of the single threads may comprise different components, i.e. the at least one polymeric resin and/or surface treated filler material product may be different, in the same amounts or the composition of the single threads may comprise different components, i.e. the at least one polymeric resin and/surface treated filler material product may be different may be different, in varying amounts.

The term "filament" in the meaning of the present invention refers to a structure that differs from fibers by its structure length. Accordingly, the term "filament" is understood to refer to endless fibers. It is further appreciated that the filament may be constructed as mono-, bi- or multi-filament. If a bi- or multi-filament is present, the composition of the single filaments may be substantially the same. That is to say, the compositions of the single filaments comprise substantially the same components, i.e. the at least one polymeric resin and surface treated filler material product, in the same amounts. Alternatively, the composition of the single filaments may be different. That is to say, the compositions of the single filaments may comprise the same components, i.e. the at least one polymeric resin and surface treated filler material product, in varying amounts or the compositions of the single filaments may comprise different components, i.e. the at least one polymeric resin and/or surface treated filler material product may be different, in the same amounts or the composition of the single filaments may comprise different components, i.e. the at least one polymeric resin and/or surface treated filler material product may be different may be different, in varying amounts.

The cross-section of the filaments and/or fibers and/or threads may have a great variety of shapes. It is preferred that the cross-sectional shape of the filaments and/or fibers and/or threads may be round, oval or n-gonal, wherein n is $\geq 3$, e.g. n is 3. For example, the cross-sectional shape of the filaments and/or fibers and/or threads is round or trilobal, like round. Additionally or alternatively, the cross-sectional shape of the filaments and/or fibers and/or threads is hollow.

It is appreciated that the filaments and/or fibers and/or threads may be prepared by all techniques known in the art used for preparing such filaments and/or fibers and/or threads. For example, the filaments and/or fibers and/or threads of the present invention can be prepared by the well known melt-blown process, spunbonded process or staple fibre production.

The term "film" in the meaning of the present invention refers to a structure that differs from filaments and/or fibers by its dimensional structure. Accordingly, the term "film" is understood to refer to a sheet.

It is appreciated that the films may be prepared by all techniques known in the art used for preparing such films. For example, the films of the present invention can be prepared by the well known techniques used for preparing stretched/oriented films, and preferably extrusion coating films, blown films, technical blown films, monotapes, cast films and the like.

In view of the very good results obtained with regard to the flowability of the surface treated filler material product treated with mono-substituted succinic anhydride(s) and a mixture of aliphatic linear or branched carboxylic acids comprising stearic acid as defined above, a further aspect of the present invention is directed to the use of at least one mono-substituted succinic anhydride and/or salty reaction product(s) thereof in combination with a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof, for improving the flowability of a surface treated filler material product.

It is appreciated that the improvement is achieved if, when measuring powder flowability with the shear cell method on a FT4 powder Rheometer (ASTM D7891-15) with a pre-shear normal stress of 15 kPa, the unconfined yield strength (UYS) is decreased by at least 7%, preferably from 7 to 30%, more preferably at least 10%, and most preferably from 10 to 30%, or the flow factor (FF) is increased by at least 7%, preferably from 7 to 30%, more preferably at least 10%, and most preferably from 10 to 30%, and/or, when measuring powder flowability via the stability and variable flow rate method on a FT4 powder Rheometer, the basic flowability energy (BFE) is decreased by at least 7%, preferably from 7 to 30%, more preferably at least 10%, and most preferably from 10 to 30%, in comparison to the same surface treated filler material product treated with the at least one mono-substituted succinic anhydride only. Throughout the present application, if not stated otherwise, the FT4 powder Rheometer (Freeman Technology, UK) was equipped with the Powder Rheometer software (v 5.000.00012) and Freeman Technology Data Analysis Software version 4.0.17.

It is appreciated that the wording "same surface treated filler material product treated with the at least one mono-substituted succinic anhydride" refers to a surface treated filler material product that has been treated with a similar amount (±0.2 wt.-%) of the at least one mono-substituted succinic anhydride instead of the sum of the amounts of the at least one mono-substituted succinic anhydride and the mixture of aliphatic linear or branched carboxylic acids comprising stearic acid according to the present invention.

The surface treated filler material product treated with mono-substituted succinic anhydride(s) and a mixture of aliphatic linear or branched carboxylic acids comprising stearic acid as defined above, also shows improved dispersion in the polymer matrix of a polymer composition. Thus, another aspect of the present invention refers to the use of at least one mono-substituted succinic anhydride and/or salty reaction product(s) thereof in combination with a mixture of aliphatic linear or branched carboxylic acids comprising stearic acid in an amount of at least 10.0 wt.-%, based on the total weight of the mixture, and one or more further saturated aliphatic linear or branched carboxylic acid(s) having a total amount of carbon atoms from C8 to C24, and/or salty reaction product(s) thereof, for improving the dispersion of the calcium carbonate in the polymer matrix of a polymer composition.

It is appreciated that the improvement is achieved if, when measuring powder flowability with the shear cell method on a FT4 powder rheometer (ASTM D7891-15) with a pre-shear normal stress of 15 kPa, the unconfined yield strength (UYS) is decreased by at least 7%, preferably from 7 to 30%, more preferably at least 10%, and most preferably from 10 to 30%, or the flow factor (FF) is increased by at least 7%, preferably from 7 to 30%, more preferably at least 10%, and most preferably from 10 to 30%, and/or, when measuring powder flowability via the stability and variable flow rate method on a FT4 powder rheometer, the basic flowability energy (BFE) is decreased by at least 7%, preferably from 7 to 30%, more preferably at least 10%, and most preferably from 10 to 30%, in comparison to the same surface treated filler material product treated with the at least one mono-substituted succinic anhydride only.

It is appreciated that the wording "same surface treated filler material product treated with the at least one mono-substituted succinic anhydride" refers to a surface treated filler material product that has been treated with a similar amount (±0.2 wt.-%) of the at least one mono-substituted succinic anhydride instead of the sum of the amounts of the at least one mono-substituted succinic anhydride and the mixture of aliphatic linear or branched carboxylic acids comprising stearic acid according to the present invention.

Another aspect of the present invention is directed to an article comprising the polymer composition as defined above and/or the surface treated filler material product as defined above and/or the fiber and/or filament and/or film and/or thread and/or sheet and/or pipe and/or profile and/or mold and/or injection mold and/or blow mold as defined above. The article is preferably selected from the group comprising hygiene products, medical and healthcare products, filter products, geotextile products, agriculture and horticulture products, clothing, footwear and baggage products, household and industrial products, packaging products, construction products and the like.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the filter products are selected from the group comprising gasoline filters, oil filters, air filters, water filters, coffee filters, tea bags, pharmaceutical industry filters, mineral processing filters, liquid cartridge and bag filters, vacuum bags, allergen membranes and laminates with non-woven layers.

Preferably, the geotextile products are selected from the group comprising soil stabilizers and roadway underlayment, foundation stabilizers, erosion control, canals construction, drainage systems, geomembrane protection, frost protection, agriculture mulch, pond and canal water barriers, sand infiltration barrier for drainage tile and landfill liners.

Preferably, the agriculture and horticulture products are selected from the group comprising crop covers, plant protection, seed blankets, weed control fabrics, greenhouse shading, root control bags, biodegradable plant pots, capillary matting, and landscape fabric.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising carrier bags, waste bags, transparent foils, hygiene films, agriculture foils, paper like foils, bottles, (thermoform) foils, extrusion coated papers and boards, boxboards, paperboard cartons, paper bags, sacks, corrugated boxes, flexible tubes, such as for cremes, e.g. dermal cremes, and cosmetics, bags, such as for household waste and crates, oriented and bi-oriented films, trays and the like.

Preferably, the household and industrial products are selected from the group comprising abrasives, bed linen like pocket cloth for pocket springs, separation layer, spring cover, top cover, quilt backing, duvet coverings, pillow cases etc., blinds/curtains, carpet/carpet backings like scatter rugs, carpet tiles, bath mats etc., covering and separation material, detergent pouches, fabric softener sheets, flooring, furniture/upholstery like inside lining, reverse fabric for cushions, dust cover, spring covering, pull strips etc., mops, table linen, tea and coffee bags, vacuum cleaning bags, wall-covering, wipes like household care wipes, floor care wipes, cleaning wipes, pet care wipes etc., automotive building, cable wrapping, civil engineering, filtration packaging, protective clothing, primary and secondary carpet backing, composites, marine sail laminates, tablecover laminates, chopped strand mats, backing/stabilizer for machine embroidery, packaging where porosity is needed, insulation like fiberglass batting, pillows, cushions, padding like upholstery padding, batting in quilts or comforters, consumer and medical face masks, mailing envelopes, tarps, tenting and transportation (lumber, steel) wrapping, disposable clothing like foot coverings and coveralls, and weather resistant house wraps.

Preferably, the construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

Preferably, the article is a packaging product, more preferably selected from the group comprising carrier bags, waste bags, transparent foils, hygiene films, agriculture foils, paper like foils, bottles, (thermoform) foils, extrusion coated papers and boards, boxboards, paperboard cartons, paper bags, sacks, corrugated boxes, flexible tubes, such as for cremes, e.g. dermal cremes, and cosmetics, bags, such as for household waste and crates, oriented and bi-oriented films, trays and the like.

Figure 1:
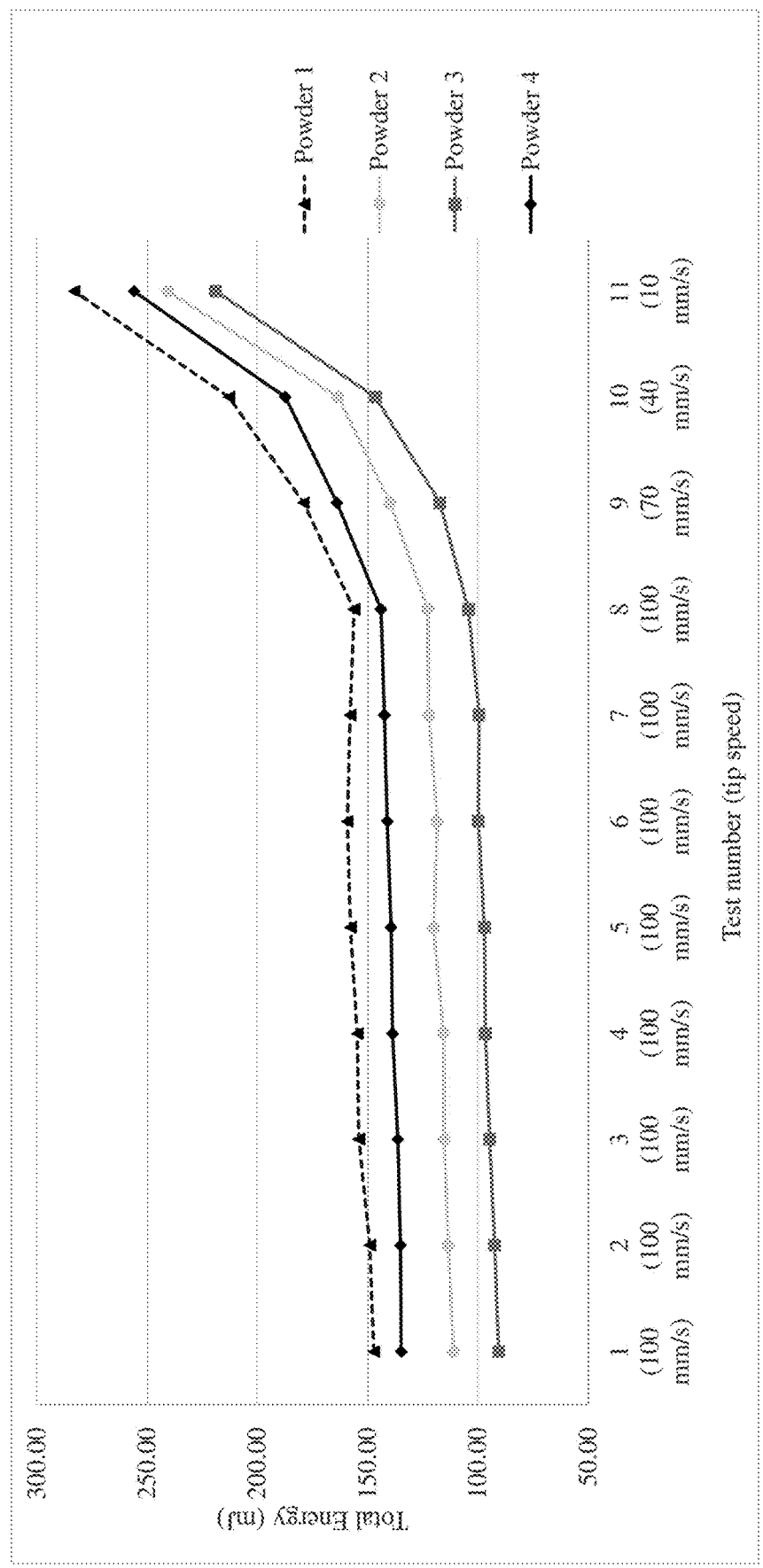
FIG. 1 refers to the powder flowability—Stability and variable flow rate of powders 1 to 4

The following examples may additionally illustrate the invention but are not meant to restrict the invention to the exemplified embodiments. The examples below show the improved flowability of the surface treated filler material product and its improved dispersion in the polymer matrix of a polymer composition.

EXAMPLES

A) Measurement Methods

The following measurement methods are used to evaluate the parameters given in the examples and claims.

Particle Size Distribution (Mass % Particles with a Diameter<X) and Weight Median Diameter ($d_{50}$) of a Particulate Material As used herein and as generally defined in the art, the "$d_{50}$" value is determined based on measurements made by using a Sedigraph™ 5100 of Micromeritics Instrument Corporation and is defined as the size at which 50% (the median point) of the particle mass is accounted for by particles having a diameter equal to the specified value.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

BET Specific Surface Area of a Material

Throughout the present document, the specific surface area (in $m^2/g$) of the mineral filler is determined using the BET method (using nitrogen as adsorbing gas), which is well known to the skilled man (ISO 9277:1995). The total surface area (in $m^2$) of the mineral filler is then obtained by multiplication of the specific surface area and the mass (in g) of the mineral filler prior to treatment.

Amount of Surface-Treatment Layer

The amount of the treatment layer on the calcium carbonate-comprising filler material is calculated theoretically from the values of the BET of the untreated calcium carbonate-containing filler material and the amount of mono-substituted succinic anhydride and the mixture of aliphatic linear or branched carboxylic acids comprising stearic acid that is used for the surface-treatment. It is assumed that 100% of the mono-substituted succinic anhydride and the mixture of aliphatic linear or branched carboxylic acids comprising stearic acid added to the calcium carbonate-containing filler material are present as surface treatment layer on the surface of the calcium carbonate-containing filler material.

Water Pick-Up

The moisture pick up susceptibility of a material as referred to herein is determined in mg moisture/g after exposure to an atmosphere of 10 and 85% relative humidity, respectively, for 2.5 hours at a temperature of +23° C. (±2° C.). For this purpose, the sample is first kept at an atmosphere of 10% relative humidity for 2.5 hours, then the atmosphere is changed to 85% relative humidity at which the sample is kept for another 2.5 hours. The weight increase between 10 and 85% relative humidity is then used to calculate the moisture pick-up in mg moisture/g of sample.

Powder Flowability—Stability and Variable Flow Rate Method

The Basic flowability energy (BFE), stability index (SI), specific energy (SE), flow rate index (FRI) and conditioned bulk density (CBD) are measured on a FT4 Powder Rheometer (Freeman Technology, UK) equipped with the Powder Rheometer software (v 5.000.00012) and Freeman Technology Data Analysis Software version 4.0.17, using the stability and variable flow rate method, using the stability and variable flow rate method.

This method consists of filling a cylindric vessel (25 mm×25 mL glass vessel). The first stage of the test process is to obtain a homogeneous, conditioned powder state to allow highly repeatable measurements to be made. A conditioning cycle comprises of the dynamic test blade slicing downward through the powder followed by an upward traverse that lifts the powder and drops it over the blade. This process helps to remove the effect of different sampling methodologies and powder storage times.

After that initial conditioning step, the powder volume is adjusted to the vessel size to remove excess powder ("split")—and the mass is recorded after the splitting step. Following that, 8 repeating cycles of conditioning and measurements with a 23.5 mm blade are performed. For each test cycle, the blade is inserted into the powder bed downward (anti-clockwise, tip speed −100 mm/s, helix angle=5°/target height 5 mm), and upward. For conditioning steps, the blade is inserted into the powder bed downwards (tip speed −40 mm/s/helix angle 5°, target height 5 mm), and upwards. After those 8 tests, 3 more cycles of (conditioning+ tests) are performed at variable flow rates, i.e. with a blade tip speed of 70 mm/s (Test 9), 40 mm/s (Test 10) and finally 10 mm/s (Test 11). The energy and torque are recorded and allow to calculate various flow parameters, defined as follow:

Basic flowability energy (BFE, mJ): Energy Cycle 7 (downwards)
Stability index: (Energy Test 7)/(Energy Cycle 1)
Specific energy (SE, mJ/g): (Up Energy cycle 6+Up Energy cycle 7)/(2×split mass)
Flow Rate Index (FRI): (Energy Test 11)/(Energy Test 8)
Conditioned bulk density (CBD, g/mL): (Split mass)/(Split volume)

Powder Flowability—Shear Cell Method

Shear cell characteristic are measured using a FT4 Powder rheometer (Freeman Technology, UK) according to ASTM D7891-15, using a cylindric vessel (50 mm×85 mL or 25 mm×10 mL glass vessel), a 48 mm or 24 mm shear cell and 15 kPa pre-shear normal stress.

The measurement was carried out using the following stepwise methodology.

Initial Powder Conditioning:

The first stage of the test process is to obtain a homogeneous, conditioned powder state to allow highly repeatable measurements to be made. A conditioning cycle comprises of the dynamic test blade slicing downward through the powder followed by an upward traverse that lifts the powder and drops it over the blade. This process helps to remove the effect of different sampling methodologies and powder storage times.

Initial Compaction

The conditioned column of powder is compacted using a ventilated compaction piston (allowing entrained air to escape), with a force equal to that of the pre-shear normal stress.

Critical Consolidation

Points on the yield loci represent the values of shear stress corresponding to incipient failure at each normal stress level. To achieve incipient failure the specimen must be over-consolidated with respect to the normal stress applied during shearing. This is realised by reaching a critical consolidation level at steady state flow and then reducing the normal stress for shearing. Thus, shear testing is a two stage process consisting of:

1. Pre-Shearing

The purpose of pre-shearing is to reach critical consolidation at a given pre-shear normal stress level. During this process shearing is continued until a steady state flow is achieved at which point pre-shearing is complete.

2. Shear Test

The normal stress is reduced so that the sample is now over consolidated with respect to the normal stress now applied. Shearing is then restarted and the point of incipient failure is measured.

For each pre-shear normal stress, five measurements are taken at the five normal stresses defined by the standard (9; 8; 7; 6 and 5 kPa). A measurement of shear stress is also taken at the preshear normal stress level i.e. at 15 kPa.

The five measurements taken make up the yield loci for each pre-shear normal stress level. The yield loci are plotted on a shear stress vs. normal stress graph, from which Mohr's circles can be added in order to extrapolate various flow data.

Data extrapolated include:
Cohesion, (C, kPa)—the Shear Stress where the Best Fit Line intercepts the y-axis, i.e. Nornal stress=0
Unconfined Yield Strength, (UYS, kPa)—the greater of the 2 values at which the smaller Mohr circle intercepts the x-axis, (also known as σc)
Major Principal Stress, (MPS, kPa)—the greater of the two values at which the larger Mohr circle intercepts the x-axis, (also known as 61).
Angle of internal friction (AIF, °)—the angle created by the best fit line with the horizontal axis
Flow factor (FF): corresponds to MPS/UYS
Bulk density (BD, g/mL): conditioned bulk density after initial compaction Extrusion Simulation The extrusion simulation was developed to evaluate the mineral dispersion in a polymer composition. The test was performed on a commercially available Collin Pressure Filter Test Teach-Line FT-E20T-IS.

The test method with each of the corresponding polymer compositions, wherein no melt pump was used, the extruder screw speed was kept at 100 rpm, and wherein the melt temperature was 225 to 230° C. (temperature setting extruder: 190° C.-210° C.-230° C.; temperature setting die: 230° C.-230° C.).

Each of the corresponding polymer compositions (900 g effective Powder A or B per 2500 g of final sample obtained by diluting the polymer composition in LLDPE ExxonMobil LL 1001 VX) was measured using a 40 μm filter (GKD Gebr. Kufferath AG, Duren, Germany, Artikelnummer 12102170055).

The results are expressed in bar and can be calculated by subtracting the final melt pressure (determined after 5 min of purging with pure polymer material) from the initial pressure of the pure polymer material (LLDPE ExxonMobil LL 1001 VX).

Ash Content

The ash content test was performed by burning 5 to 30 g of the corresponding polymer composition at 570° C. for 120 minutes.

B) Materials
Calcium Carbonate-Containing Filler Materials
Calcium Carbonate-Comprising Filler Material 1 (Powder 1; Comparative)

0.7 kg of a wet ground and spray dried marble from Carrara, Italy ($d_{50}$=1.6 µm, BET specific surface area=4.1 m²/g) is placed in a high speed mixer (Somakon MP-LB Mixer, Somakon Verfahrenstechnik, Germany), and conditioned by stirring for 10 minutes (1000 rpm, 120° C.). After that time, 0.6 parts by weight relative to 100 parts by weight $CaCO_3$ of mono-substituted succinic anhydride 1 is added to the mixture. Stirring and heating is then continued for another 15 minutes (120° C., 1000 rpm). After that time, the mixture is allowed to cool and the powder is collected (powder 1).

Calcium Carbonate-Containing Filler Material 2 (Powder 2; Inventive)

0.7 kg of a wet ground and spray dried marble from Carrara, Italy ($d_{50}$=1.6 µm, BET specific surface area=4.1 m²/g) is placed in a high speed mixer (Somakon MP-LB Mixer, Somakon Verfahrenstechnik, Germany), and conditioned by stirring for 10 minutes (1000 rpm, 120° C.). After that time, 0.5 parts by weight relative to 100 parts by weight $CaCO_3$ of mono-substituted succinic anhydride 1 and 0.2 parts by weight relative to 100 parts by weight $CaCO_3$ of carboxylic acids mixture 2 is added simultaneously to the mixture. Stirring and heating is then continued for another 15 minutes (120° C., 1000 rpm). After that time, the mixture is allowed to cool and the powder is collected (powder 2).

Calcium Carbonate-Containing Filler Material 3 (Powder 3; Inventive)

0.7 kg of a wet ground and spray dried marble from Carrara, Italy ($d_{50}$=1.6 µm, BET specific surface area=4.1 m²/g) is placed in a high speed mixer (Somakon MP-LB Mixer, Somakon Verfahrenstechnik, Germany), and conditioned by stirring for 10 minutes (1000 rpm, 120° C.). After that time, 0.4 parts by weight relative to 100 parts by weight $CaCO_3$ of mono-substituted succinic anhydride 1 and 0.4 parts by weight relative to 100 parts by weight $CaCO_3$ of carboxylic acids mixture 2 is added simultaneously to the mixture. Stirring and heating is then continued for another 15 minutes (120° C., 1000 rpm). After that time, the mixture is allowed to cool and the powder is collected (powder 3).

Calcium Carbonate-Containing Filler Material 4 (Powder 4; Inventive)

0.7 kg of a wet ground and spray dried marble from Carrara, Italy ($d_{50}$=1.6 µm, BET specific surface area=4.1 m²/g) is placed in a high speed mixer (Somakon MP-LB Mixer, Somakon Verfahrenstechnik, Germany), and conditioned by stirring for 10 minutes (1000 rpm, 120° C.). After that time, 0.4 parts by weight relative to 100 parts by weight $CaCO_3$ of mono-substituted succinic anhydride 1 is added to the mixture. Stirring and heating is then continued for another 15 minutes (120° C., 1000 rpm). Then, 0.2 parts by weight relative to 100 parts by weight $CaCO_3$ of carboxylic acids mixture 2 is added to the mixture and stirring and heating is then continued for another 15 minutes (120° C., 1000 rpm). After that time, the mixture is allowed to cool and the powder is collected (powder 4).

Mono-Substituted Succinic Anhydride

Mono-Substituted Succinic Anhydride (ASA) 1

Mono-substituted alkenyl succinic anhydride (2,5-Furandione, dihydro-, mono-C15-20-alkenyl derivs., CAS No. 68784-12-3) is a blend of mainly branched octadecenyl succinic anhydrides (CAS #28777-98-2) and mainly branched hexadecenyl succinic anhydrides (CAS #32072-96-1). More than 80% of the blend is branched octadecenyl succinic anhydrides. The purity of the blend is >95 wt.-%. The residual olefin content is below 3 wt.-%.

Carboxylic Acids Mixture 2

Carboxylic acids mixture 2 is a 1:1 mixture of stearic acid and palmitic acid.

Powder A (inventive): Dry grinded limestone from Nocera Umbria ($d_{50}$=3.2, top cut=12 µm; BET specific surface area=3.0 m²/g), treated with 0.35% by weight of mono-substituted succinic anhydride 1 and 0.15% by weight of carboxylic acid mixture 2.

Powder B (prior art): Dry grinded limestone from Nocera Umbria ($d_{50}$=3.2, top cut=12 µm; BET specific surface area=3.0 m²/g), treated with 0.45% by weight of mono-substituted succinic anhydride 1.

Analysis and Test Results

Example 1: Water Pick-Up Results

TABLE 1

Water pick-up values for powders 1 to 4.

| Powder | waterpickup (mg/g) |
|---|---|
| powder 1; comparative | 0.5 |
| powder 2; inventive | 0.4 |
| powder 3; inventive | 0.45 |
| powder 4; inventive | 0.2 |

Example 2: Powder Flowability: Stability and Variable Flow Rate

Powder flowability of powders 1 to 4 was measured on a FT4 Powder Rheometer from Freeman Technology using the stability and variable flow rate method in a 25 mm×25 mL measuring cell. Improved powder flowabilities were achieved with powders 2-4, compared to the reference powder 1, as can be seen from the lower basic flowability energy obtained with those powders (FIG. 1 & Table 2)

TABLE 2

Powder flowability - Stability and variable flow rate (powders 1 to 4), Basic flowability energy (BFE), Stability index (SI), Flow rate index (FRI), specific energy (SE), conditioned bulk density (CBD)

| Powder | BFE, mJ | SI | FRI | SE, mJ/g | CBD, g/ml |
|---|---|---|---|---|---|
| Powder 1 | 158.13 | 1.07 | 1.81 | 7.89 | 0.69 |
| Powder 2 | 122.42 | 1.10 | 1.96 | 6.95 | 0.70 |
| Powder 3 | 99.49 | 1.10 | 2.10 | 6.17 | 0.71 |
| Powder 4 | 142.47 | 1.06 | 1.78 | 7.19 | 0.70 |

Improved powder flowabilities were achieved with powders 2-4, compared to the reference powder 1, as can be seen from the lower basic flowability energy obtained with those powders (FIG. 1 & Table 2)

Example 3. Production of a Polymer Composition (Masterbatch) and Test Result (Ash Content and Extrusion Simulation)

Masterbatches (MB) were prepared following the protocol describe hereafter.

The polymer compositions comprising 25 wt.-% of Dowlex 5056G (LLPDE, MFI=1 g/10 min) and 75 wt.-% Powder A or B respectively, (Masterbatch A or B), were prepared on a lab scale using a Buss kneader (PR46 from Buss AG, Switzerland, L/d of 10) at 10 kg/h and processed at the following machine setting:

Temperature of the screw: 100° C.
Temperature of extruder (2 zones): 190° C.-170° C.
Temperature of the extraction (1 zone): 170° C.
Screw speed: 200 rpm
Dosing of polymer: 100% in main hopper
Dosing of powder: 73% in main hopper, 27% in side feeder The obtained mixtures were pelletized on a spring load pelletizer, model SLC (Gala, USA) in a water bath having a starting temperature between 20 and 25° C. The compositions and filler contents of the prepared Masterbatches are compiled in Table 3 below. The precise filler contents were determined by the ash content. Furthermore, an extrusion simulation test was carried out in order to determine the dispersion quality of the filler material product in the polymer matrix of the compounded materials.

The results shown in Table 3 confirm that Masterbatches A and B with good quality were produced. Furthermore, the extrusion simulation test revealed that the surface treated filler material product of the present invention, i.e. Masterbatch A, shows an improved dispersion quality in the compounded polymer matrix, compared to the prior art filler material product, i.e. Masterbatch B.

TABLE 3

Compositions and properties of the prepared Masterbatches

|  | MB A (based on powder A) | MB B (based on powder B) |
|---|---|---|
| Amount of powder (wt.-%) | 74.3 | 74 |
| Amount of LLPDE (wt.-%) | 25.7 | 26 |
| Pressure increase during extrusion simulation test at 40 pm pore size (bar) | 12.4 | 13.4 |

The pressure increase by extruding 900 g of powder A in a 40 µm sieve is lower than for powder B, thus demonstrating the advantageous properties, the improved dispersion of powder A in the compounded polymer matrix.

Example 4: Powder Flowability: Shear Cell

Figure 2:
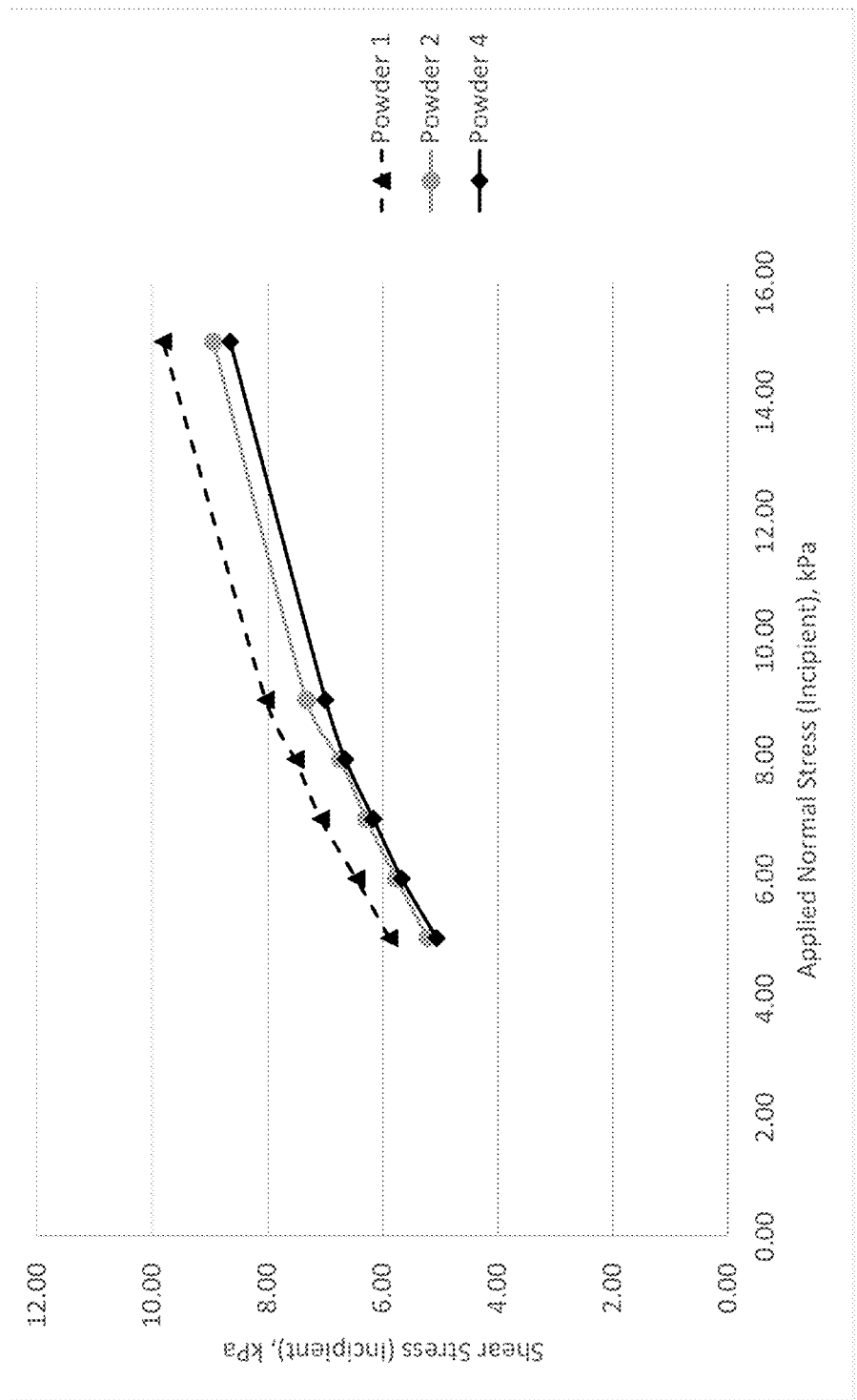
FIG. 2 refers to the powder flowability—Shear cell of powders 1, 2, and 4

Powder flowability of powders 1 to 4 was measured on a FT4 Powder Rheometer from Freeman Technology using the shear cell method (15 kPa) in a 25 mm×10 mL measuring cell. Improved powder flowabilities and lower cohesion were achieved with powders 2 and 4, compared to the reference powder 1, as can be seen from the lower cohesion values, lower unconfined yield strength (UYS) and higher flow factor (FF) obtained with those powders (FIG. 2 & Table 4)

TABLE 4

Powder flowability - Shear cell (powders 1 to 4), Cohesion, Unconfined yield Strength (UYS), Major principal stress (MPS) and Flow factor (FF)

| Powder | Cohesion, kPa | UYS, kPa | MPS, kPa | FF |
|---|---|---|---|---|
| Powder 1 | 3.25 | 10.85 | 24.56 | 2.26 |
| Powder 2 | 2.64 | 8.68 | 23.37 | 2.69 |
| Powder 4 | 2.71 | 8.66 | 22.97 | 2.65 |

The invention claimed is:

1. A surface treated filler material product comprising
   a) at least one calcium carbonate-containing filler material,
   b) a treatment layer on the surface of the at least one calcium carbonate-containing filler material comprising at least one mono-substituted succinic anhydride and/or salty reaction product(s) thereof and a mixture of aliphatic linear or branched carboxylic acids comprising stearic acid in an amount of at least 10.0 wt. %, based on the total weight of the mixture, and one or more further saturated aliphatic linear or branched carboxylic acid(s) having a total amount of carbon atoms from C8 to C24, and/or salty reaction product(s) thereof,
   wherein the surface treated filler material product comprises the treatment layer in an amount of from 0.2 to 6 wt. %, based on the total dry weight of the at least one calcium carbonate-containing filler material, wherein the surface treated filler material product is in form of a powder.

2. The surface treated filler material product according to claim 1, wherein the calcium carbonate-containing filler material is selected from the group consisting of ground calcium carbonate, marble, limestone, dolomite, chalk, precipitated calcium carbonate (PCC), vaterite, calcite, aragonite, surface-reacted calcium carbonate (MCC) and mixtures thereof.

3. A polymer composition comprising at least one polymeric resin and from 1 to 95 wt.-%, based on the total weight of the polymer composition, of the surface treated filler material product according to claim 1.

4. The polymer composition according to claim 3, wherein the at least one polymeric resin is at least one thermoplastic polymer.

5. The polymer composition according to claim 3, wherein the polymer composition is a masterbatch.

6. A fiber and/or filament and/or film and/or thread and/or sheet and/or pipe and/or profile and/or mold and/or injection molds and/or blow mold comprising the surface treated filler product according to claim 1 or a polymer composition comprising at least one polymeric resin and from 1 to 95 wt. %, based on the total weight of the polymer composition, of the surface treated filler material product according to claim 1.

7. An article comprising the surface treated filler material product according to claim 1 or a polymer composition comprising at least one polymeric resin and from 1 to 95 wt. %, based on the total weight of the polymer composition, of the surface treated filler material product according to claim 1,
   wherein the article is selected from the group consisting of hygiene products, medical and healthcare products, filter products, geotextile products, agriculture and horticulture products, clothing, footwear and baggage products, household and industrial products, packaging products, and construction products.

8. The article according to claim 7 being a packaging product selected from the group consisting of carrier bags, waste bags, transparent foils, hygiene films, agriculture foils, paper like foils, bottles, thermoform foils, extrusion coated papers and boards, boxboards, paperboard cartons, paper bags, sacks, corrugated boxes, flexible tubes, bags, oriented and bi-oriented films, and trays.

9. An article comprising the fiber and/or filament and/or film and/or thread and/or sheet and/or pipe and/or profile and/or mold and/or injection molds and/or blow mold according to claim 6, wherein the article is selected from the group consisting of hygiene products, medical and healthcare products, filter products, geotextile products, agriculture and horticulture products, clothing, footwear and baggage products, household and industrial products, packaging products, and construction products.

10. The surface treated filler material product according to claim 1, wherein the at least one calcium carbonate-containing filler material has
    a) a weight median particle size $d_{50}$ value in the range from 0.1 µm to 7 µm and/or
    b) a top cut ($d_{98}$) of ≤50 µm and/or
    c) a specific surface area (BET) of from 0.5 to 150 m²/g and/or
    d) a residual total moisture content of from 0.01 wt.-% to 1 wt.-%, based on the total dry weight of the at least one calcium carbonate-containing filler material.

11. The polymer composition according to claim 3, wherein the polymer composition is a masterbatch and the masterbatch comprises the surface treated filler material product in an amount of from 50 to 95 wt.-%.

12. The surface treated filler material product according to claim 1, wherein the at least one calcium carbonate-containing filler material has
    a) a weight median particle size $d_{50}$ value in the range from 0.5 µm to 4 µm and/or
    b) a top cut ($d_{98}$) of ≤15 µm and/or
    c) a specific surface area (BET) of from 0.5 to 10 m²/g and/or
    d) a residual total moisture content of from 0.04 wt.-% to 0.2 wt.-%, based on the total dry weight of the at least one calcium carbonate-containing filler material.

13. The surface treated filler material product according to claim 1, wherein the at least one mono-substituted succinic anhydride consists of succinic anhydride mono-substituted with a group selected from a linear, branched, aliphatic and cyclic group having a total amount of carbon atoms from C2 to C30 in the substituent.

14. The surface treated filler material product according to claim 1, wherein the at least one mono-substituted succinic anhydride is
    a) at least one alkyl mono-substituted succinic anhydride, ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof, and/or
    b) at least one alkenyl mono-substituted succinic anhydride, ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

15. The surface treated filler material product according to claim 1, wherein the mixture of saturated aliphatic linear or branched carboxylic acids comprises stearic acid and one or more further saturated aliphatic linear or branched carboxylic acid(s) having a total amount of carbon atoms from C8 to C22.

16. A process for preparing a surface treated filler material product of claim 1, the process comprising the steps of:
    a) providing at least one calcium carbonate-containing filler material,
    b) providing at least one mono-substituted succinic anhydride,
    c) providing a mixture of aliphatic linear or branched carboxylic acids comprising stearic acid in an amount of at least 10.0 wt. %, based on the total weight of the mixture, and one or more further saturated aliphatic linear or branched carboxylic acid(s) having a total amount of carbon atoms from C8 to C24,
    d) contacting the surface of the at least one calcium carbonate-containing filler material of step a), under mixing, in one or more steps, in any order, with the at least one mono-substituted succinic anhydride of step b) and the mixture of aliphatic linear or branched carboxylic acids of step c) such that a treatment layer comprising the at least one mono-substituted succinic anhydride and/or salty reaction product(s) thereof and the mixture of aliphatic linear or branched carboxylic acids and/or salty reaction product(s) thereof is formed on the surface of said at least one calcium carbonate-containing filler material of step a),
    wherein the temperature before and/or during contacting step d) is adjusted such that the at least one mono-substituted succinic anhydride and the mixture of aliphatic linear or branched carboxylic acids is in a molten or liquid state, wherein the surface treated filler material product is in form of a powder.

17. The process according to claim 16, wherein the at least one calcium carbonate-containing filler material of step a) is preheated before contacting step d) is carried out.

18. The process according to claim 16, wherein contacting step d) is carried out in that the at least one mono-substituted succinic anhydride of step b) and the mixture of saturated aliphatic linear or branched carboxylic acids of step c) are added in a weight ratio [succinic anhydride/mixture of carboxylic acids] of from 10:1 to 1:10.

19. The process according to claim 16, wherein the at least one mono-substituted succinic anhydride of step b) is added in contacting step d) in a total amount of from 0.1 to 3 wt.-%, based on the total dry weight of the at least one calcium carbonate-containing filler material of step a); and the mixture of saturated aliphatic linear or branched carboxylic acids of step c) is added in contacting step d) in a total amount of from 0.1 to 3 wt.-%, based on the total dry weight of the at least one calcium carbonate-containing filler material of step a).

20. The process according to claim 16, wherein contacting step d) is carried out at a temperature of from 20 to 200° C.

21. The process according to claim 16, wherein contacting step d) is carried out in that the at least one mono-substituted succinic anhydride of step b) and the mixture of saturated aliphatic linear or branched carboxylic acids of step c) are added simultaneously or in that the mixture of saturated aliphatic linear or branched carboxylic acids of step c) is added after the at least one mono-substituted succinic anhydride of step b).

22. The process according to claim 16, wherein the at least one calcium carbonate-containing filler material has
    a) a weight median particle size $d_{50}$ value in the range from 0.1 µm to 7 µm and/or
    b) a top cut ($d_{98}$) of ≤50 µm and/or
    c) a specific surface area (BET) of from 0.5 to 150 m²/g and/or
    d) a residual total moisture content of from 0.01 wt.-% to 1 wt.-%, based on the total dry weight of the at least one calcium carbonate-containing filler material.

23. The process according to claim 16, wherein the at least one mono-substituted succinic anhydride consists of succinic anhydride mono-substituted with a group selected from a linear, branched, aliphatic and cyclic group having a total amount of carbon atoms from C2 to C30 in the substituent.

* * * * *